(12) United States Patent
Dang et al.

(10) Patent No.: US 11,219,053 B2
(45) Date of Patent: Jan. 4, 2022

(54) WIRELESS COMMUNICATION METHOD AND DEVICE BASED ON LICENSE-FREE BAND

(71) Applicant: Sony Corporation, Tokyo (JP)

(72) Inventors: Jian Dang, Nanjing (CN); Minghao Guo, Nanjing (CN); Weiwen Chu, Nanjing (CN); Penshun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 54 days.

(21) Appl. No.: 16/615,141

(22) PCT Filed: Apr. 23, 2018

(86) PCT No.: PCT/CN2018/084006
§ 371 (c)(1),
(2) Date: Nov. 20, 2019

(87) PCT Pub. No.: WO2019/001116
PCT Pub. Date: Jan. 3, 2019

(65) Prior Publication Data
US 2020/0178283 A1    Jun. 4, 2020

(30) Foreign Application Priority Data
Jun. 29, 2017 (CN) .......................... 201710514548.1

(51) Int. Cl.
*H04W 72/12* (2009.01)
*H04L 5/00* (2006.01)
(Continued)

(52) U.S. Cl.
CPC ....... *H04W 72/1284* (2013.01); *H04L 5/0053* (2013.01); *H04W 16/14* (2013.01);
(Continued)

(58) Field of Classification Search
CPC ........... H04W 72/1284; H04W 72/042; H04W 72/1289; H04W 72/14; H04W 16/14; H04W 24/08; H04W 24/10; H04L 5/0053
(Continued)

(56) References Cited

U.S. PATENT DOCUMENTS

2015/0078264 A1* 3/2015 Han .................. H04W 36/0058
370/329
2015/0215903 A1* 7/2015 Zhao ..................... H04W 72/02
370/329
(Continued)

FOREIGN PATENT DOCUMENTS

CN       105284172 A     1/2016
WO       2016/053639 A1  4/2016

OTHER PUBLICATIONS

Extended European search report dated Jul. 22, 2020, in corresponding European patent Application No. 18825428.8, 14 pages.
(Continued)

*Primary Examiner* — Peter G Solinsky
(74) *Attorney, Agent, or Firm* — Xsensus, LLP

(57) ABSTRACT

The present invention relates to a wireless communication method and device based on a license-free band. A method for wireless communication between a base station and a user terminal comprises: receiving uplink transmission from a first type user terminal, the first type user terminal operating in a license-free mode; and switching at least one first type user terminal to a licensed mode if the evaluated decoding performance of the uplink transmission does not reach a desired level. The decoding performance is an indicator capable of more accurately reflecting the degree of resource contention, and thus can more reasonably determine the time of switching the user terminal to the licensed mode.

7 Claims, 23 Drawing Sheets

(51) Int. Cl.
  *H04W 16/14* (2009.01)
  *H04W 24/08* (2009.01)
  *H04W 24/10* (2009.01)
  *H04W 72/04* (2009.01)
  *H04W 72/14* (2009.01)
(52) U.S. Cl.
  CPC .......... *H04W 24/08* (2013.01); *H04W 24/10* (2013.01); *H04W 72/042* (2013.01); *H04W 72/1289* (2013.01); *H04W 72/14* (2013.01)
(58) Field of Classification Search
  USPC ........................................................ 370/329
  See application file for complete search history.

(56) References Cited

U.S. PATENT DOCUMENTS

| | | | |
|---|---|---|---|
| 2016/0119844 A1 | 4/2016 | Uchino et al. | |
| 2017/0127435 A1* | 5/2017 | Rong | H04L 5/0053 |
| 2018/0139774 A1* | 5/2018 | Ma | H04L 1/189 |
| 2020/0059935 A1* | 2/2020 | Qian | H04W 74/02 |
| 2021/0084668 A1* | 3/2021 | Ahmed | H04W 72/042 |

OTHER PUBLICATIONS

Lenovo et al., "Discussion of procedures for UL transmission with and without grant", 3GPP TSG RAN WG1 Meeting #89, R1-1707766, May 15-19, 2017, total 4 pages, Hangzhou, China.

Potevio, "Discussion on UL grant-free transmission for URLLC", 3GPP TSG-RAN WG2 Meeting #98, R2-1705047, May 15-19, 2017, total 3 pages, Hangzhou, China.

International Search Report and Written Opinion dated Jul. 12, 2018 for PCT/CN2018/084006 filed on Apr. 23, 2018, 10 pages including English Translation of the International Search Report.

Zte, et al., "WF on UL grant-free for URLLC", R1-1613596, 3GPP TSG RAN WG1 Meeting No. 87, Reno, USA, Nov. 14-18, 2016, 4 pages.

* cited by examiner

WIRELESS COMMUNICATION METHOD AND DEVICE BASED ON LICENSE-FREE BAND

CROSS-REFERENCE TO RELATED APPLICATIONS

The present application is based on PCT filing PCT/CN2018/084006, filed Apr. 23, 2018, which claims priority to CN 201710514548.1, filed Jun. 29, 2017, the entire contents of each are incorporated herein by reference.

FIELD

Embodiments disclosed herein relate to wireless communications, and in particular to a wireless communication method and device based on a grant-free frequency band.

BACKGROUND

With the rapid development of the Mobile Internet, traffic of mobile data has rapidly increased, which is in contradiction with limited grant spectrum resources. The deployment of a Long Term Evolution (LTE) system in a grant-free band has become a research hotspot for the Fifth Generation Mobile Communication Technology (5G) standard. For example, it has been proposed to deploy an improved LTE system using a 5 GHz grant-free band to achieve deep integration of LTE systems based on grant and grant-free bands.

In the standardization proposal R1-1612138 proposed by MediaTek Inc in the third Generation Partnership Project Program (3GPP), a mixed scheduling request and data transmission scheme is described, in which both a scheduling request and data may be transmitted in a grant mode or a grant-free mode. The proposal provides a grant scheduling request and a grant-free data transmission scheme, in which the scheduling request occupies dedicated resources, thus the utilization rate of resources is still not high enough.

In the standardization proposal R1-167252 proposed by Nokia in 3GPP, a division and initial access scheme for a grant area and a grant-free area is described, in which dynamical adjustment is performed on the two areas according to a type of a user, an amount of transmission data, and a requirement for time delay.

In the standardization proposal R1-1702116 proposed by Sequans in 3GPP, a grant-free scheduling transmission scheme of super reliable low latency communication (URLLC) is described, in which direct transmission is performed for one of two URLLC users accessing the same resource block, and carrier sensing is required for the other one of the two URLLC users, and data transmission is only performed when the channel is idle.

5G application scenarios include, for example, a massive machine type communication (mMTC) scenario and an ultra reliable low latency communication (URLLC) scenario. The mMTC is characterized by a large number of accessed terminals and a low power consumption, and the URLLC is characterized by a high transmission reliability and a low time delay. The two application scenarios have a common advantage that the transmission data includes small data packets that are not continuous. Compared with the conventional grant-based transmission scheme, the grant-free transmission scheme is more suitable for application requirements of the mMTC scenario and the URLLC scenario, which can avoid a low efficiency and a high energy consumption caused by scheduling a large number of devices. In such an application scenario, user data may collide and data packet may be lost due to lack of necessary scheduling information. Especially when the number of users suddenly increases, the system performance deteriorates rapidly.

SUMMARY

According to an exemplary embodiment of the present disclosure, a method of wireless communication between a base station and user terminals is provided. According to the method, uplink transmissions from first type user terminals are received. The first type user terminals operate in a grant-free mode. In case that an evaluated decoding performance of the uplink transmissions is below a desired level, at least one of the first type user terminals is switched to a grant mode.

According to an exemplary embodiment of the present disclosure, a method of performing wireless communication between a base station and user terminals is provided. According to the method, it is determined whether a received uplink transmission includes a preamble based on the uplink transmission. If the uplink transmission does not include the preamble, it is determined that the uplink transmission comes from a first type user terminal and the received uplink transmission is decoded. The first type user terminal has a first priority and operates in the grant-free mode. If the uplink transmission includes the preamble, it is determined that the uplink transmission comes from a second type user terminal and the received uplink transmission is decoded. The uplink transmission includes the preamble and data following the preamble, the preamble includes an identification for the second type user terminal transmitting the preamble, and the second type user terminal has a second priority and operates in a grant-free mode. The first priority is lower than the second priority.

According to an exemplary embodiment of the present disclosure, a method of performing grant-free uplink transmission in a user terminal is provided. According to the method, at least one resource unit is selected from a resource pool for the grant-free uplink transmission. A transmission activity at a preamble on the resource unit is detected. The uplink transmission is performed on the resource unit where no transmission activity is detected.

According to an exemplary embodiment of the present disclosure, a method of performing wireless communication between a base station and user terminals is provided. According to the method, an uplink transmission from a user terminal operating in a grant-free mode is received. It is determined whether the uplink transmission includes a preamble. If the uplink transmission does not include the preamble, the received uplink transmission is decoded. If the uplink transmission is decoded successfully, no response is transmitted for the uplink transmission.

According to an exemplary embodiment of the present disclosure, a method of performing wireless communication between a base station and user terminals is provided. According to the method, an uplink transmission from a user terminal operating in a grant-free mode is received. It is determined whether the uplink transmission includes a preamble. If the uplink transmission does not include the preamble, the received uplink transmission is decoded. If a user identification in the uplink transmission is decoded successfully and data in the uplink transmission is not decoded successfully, a negative acknowledgment (NACK) is transmitted to the user terminal indicated by the user identification through downlink control information.

According to an exemplary embodiment of the present disclosure, a method of performing wireless communication between a base station and user terminals is provided. According to the method, an uplink transmission from a user terminal operating in a grant-free mode is received. It is determined whether the uplink transmission includes a preamble. If the uplink transmission does not include the preamble, the received uplink transmission is decoded. If a user identification in the uplink transmission and data on the at least one resource unit are not decoded successfully, broadcast information accessible to the user terminal is transmitted. The broadcast information includes information identifying a resource unit and information identifying a user terminal which has transmitted, on the resource unit, data that is decoded successfully.

According to an exemplary embodiment of the present disclosure, a method of performing grant-free uplink transmission in a user terminal is provided. According to the method, an uplink transmission of a current cycle is performed. The user terminal operates in the grant-free mode. A NACK and broadcast information from a base station are waited. It is confirmed that the uplink transmission on a resource unit is successful in case of meeting the following condition: 1) no NACK for the resource unit and broadcast information is received, where the broadcast information includes information identifying a resource unit for carrying data which is not decoded successfully and information identifying a user terminal which has transmitted, on the resource unit, data that is decoded successfully, or 2) no NACK for the resource unit is received, but broadcast information is received, where information in the broadcast information indicates that the uplink transmission of the user terminal on the resource unit is decoded successfully.

According to an exemplary embodiment of the present disclosure, a method of performing grant-free uplink transmission in a user terminal is provided. According to the method, an uplink transmission of a current cycle is performed. The user terminal operates in the grant-free mode. A NACK and broadcast information from a base station are waited. It is confirmed that the uplink transmission on a resource unit is not successful in case of meeting the following condition: 1) a NACK for the resource unit is received, or 2) broadcast information is received, where the broadcast information includes information identifying a resource unit for carrying data which is not decoded successfully and information identifying a user terminal which has transmitted, on the resource unit, data that is decoded successfully, where information in the broadcast information does not indicate that the uplink transmission of the user terminal on the resource unit is decoded successfully.

Features and advantages of the exemplary embodiments of the present disclosure, as well as structures and operations of the exemplary embodiments of the present disclosure, are described in detail below with reference to the drawings. It should be noted that the present disclosure is not limited to the specific embodiments described herein. The embodiments herein are described for illustrative purposes only. Other embodiments may occur to those skilled in the art in view of the teachings contained herein.

BRIEF DESCRIPTION OF THE DRAWINGS

The exemplary embodiments disclosed herein are illustrated by way of examples in the drawings, however, these examples are not intended to limit the present disclosure. In the drawings, similar elements are indicated by similar reference numerals.

DETAILED DESCRIPTION OF EMBODIMENTS

Figure 1:
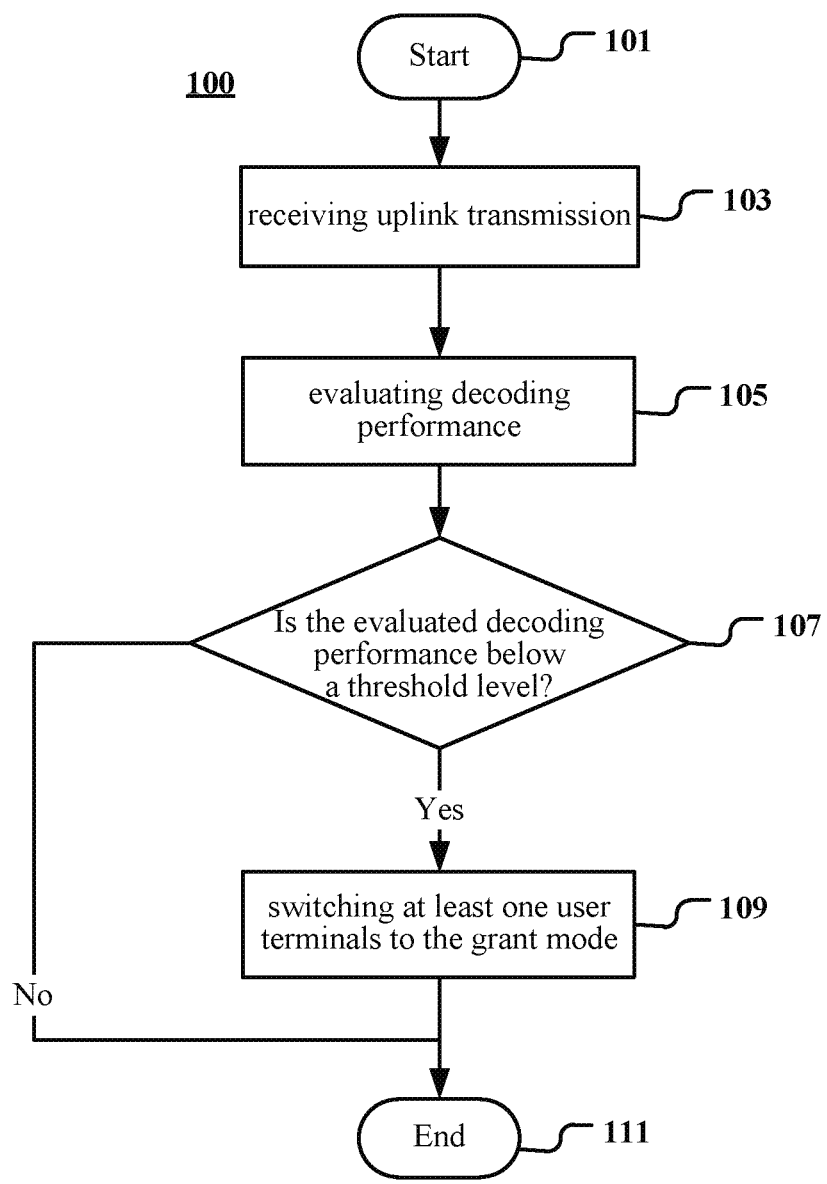
FIG. 1 is a flowchart of a method of wireless communication between a base station and user terminals according to an exemplary embodiment of the present disclosure.

Hereinafter, exemplary embodiments of the present disclosure are described in detail by referring to the drawings. It should be noted that, for the sake of clarity, the representation and description of a part and a process that are known to those skilled in the art but are not related to the exemplary embodiments are omitted in the drawings and the description.

Compared with a conventional grant-based transmission mode, in a grant-free transmission mode, a user terminal is allowed to transmit data via a transmission resource without transmitting a scheduling request when there is a transmission demand. However, due to the lack of centralized scheduling of a base station, the user terminal occupies transmission resources in a random and disordered manner in the grant-free transmission mode, which may result in collision and data packet loss. Especially when the number of users suddenly increases, the decoding performance of the system deteriorates rapidly.

In the standardization proposal R1-167252 proposed by Nokia in 3GPP, a division and initial access scheme for a grant area and a non-grant area is described, in which dynamical adjustment is performed on the two areas according to a type of a user, an amount of transmission data, and a requirement for time delay. However, the degradation of decoding performance in the grant-free transmission mode is mainly caused by the contention of the same grant-free transmission resource by multiple user terminals, while the type of a user type, the amount of transmission data, and the requirement for time delay cannot reflect a true degree of contention. Therefore, switching between the grant-based transmission mode and the grant-free transmission mode cannot accurately predict and manage the decoding performance of the system.

According to an exemplary embodiment of the present disclosure, a method of wirelessly communicating between a base station and user terminals may include: receiving uplink transmissions from user terminals operating in a grant-free mode; and switching at least one of the user terminals to a grant mode in case that an evaluated decoding performance of the uplink transmissions is below a desired level.

FIG. 1 is a flowchart of a method 100 of wireless communication between a base station and user terminals according to an exemplary embodiment of the present disclosure.

As shown in FIG. 1, the method starts from step 101. In step 103, a base station receives uplink transmissions from user terminals of the same type. The user terminals operate in a grant-free mode. For example, the user terminal may be an mMTC user terminal or a URLLC terminal, or an Enhanced Mobile Broadband (eMBB) user terminal. In an example, the user terminals may have the same priority. In another example, the user terminals may have different priorities.

In the grant-free mode, the user terminal may typically operate in time slots. If there is data to be transmitted, the user terminal selects a transmission resource (for example, a resource block) to use from a resource pool and transmits the data on the transmission resource. Then, the user terminal acquires a confirmation of the transmitted data from the base station so as to determine whether to retransmit the data or transmit new data in the next time slot. These operations are usually performed in one time slot. Correspondingly, the base station receives transmitted data from each user terminal on the transmission resource in the time slot, decodes the received data, and feeds back a decoding result to the user terminal so as to make a confirmation of the data transmission by the user terminal. In an example, the resource pool may be divided into multiple resource blocks, each of which is independent from each other and occupies some of subframes in a time domain and some of subcarriers in a frequency domain.

In step 105, the base station evaluates the decoding performance of the received uplink transmission.

The decoding performance reflects a capability of the base station to successfully decode the received uplink transmission. For example, when the decoding performance is represented by the number of successful decoding within a predetermined time, a large number of successful decoding represents a high decoding performance. When the decoding performance is represented by the number of failed decoding within a predetermined time, a large number of failed decoding represents a low decoding performance. The decoding performance may also be represented by the ratio of the number of successful decoding to the number of failed decoding. The predetermined time refers to a period of time having a predetermined duration, which may be a single time slot or multiple consecutive time slots. The number of decoding may be counted based on, for example, a resource element (for example, a resource block). In this case, when an uplink transmission on one resource unit is decoded once, the number of decoding is incremented by one. The number of decoding may also be counted based on, for example, a user terminal. In this case, when an uplink transmission from one user terminal is decoded once, the number of decoding is incremented by one. When the user terminal uses only one resource unit in one time slot, the same number of decoding may be obtained with the two counting methods.

Figure 2:
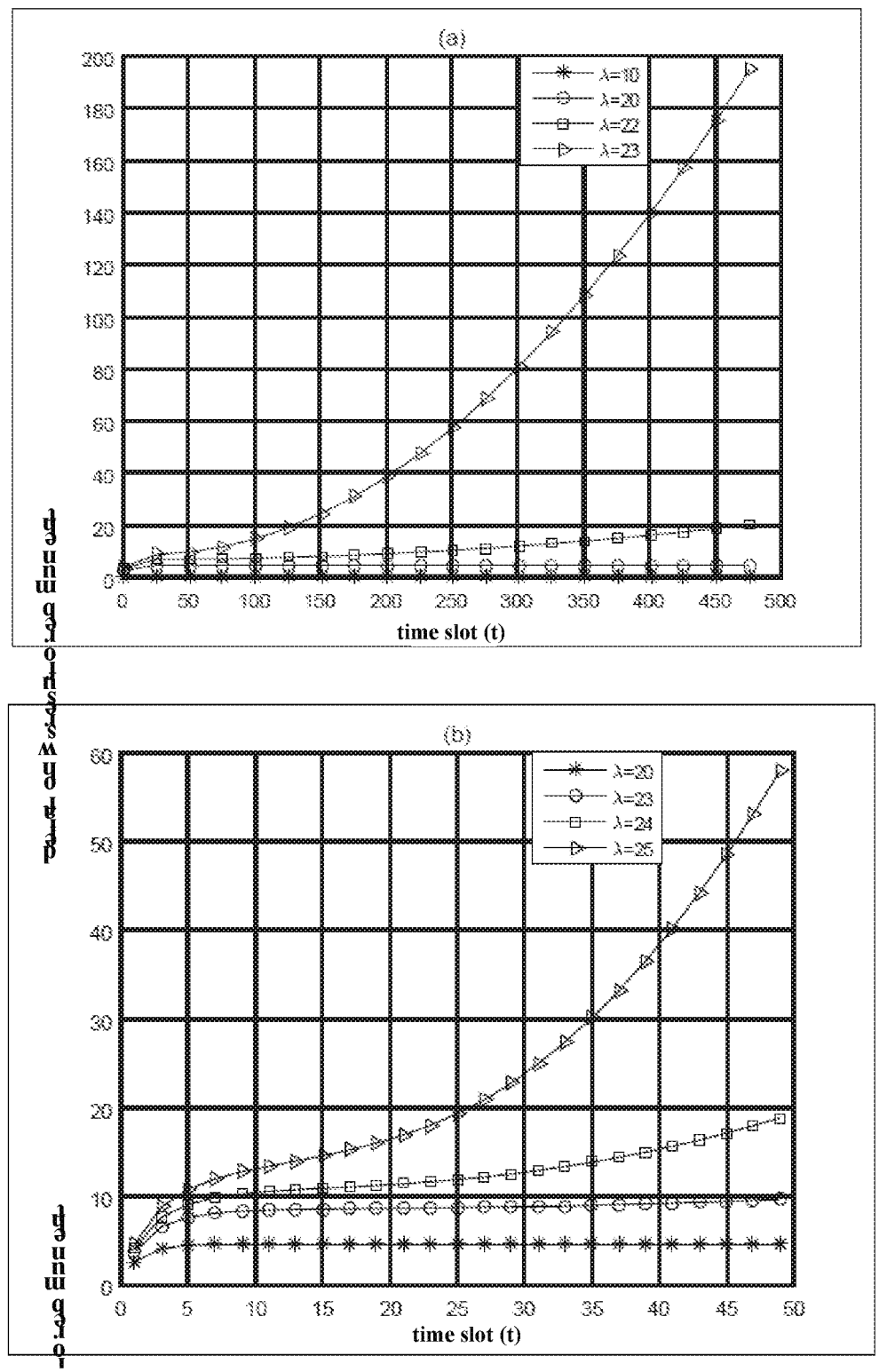
FIG. 2 are exemplary curves showing relations between an accumulated number of user terminals encountering a decoding failure and an accumulated time under conditions of different average number $\lambda$.

There are relations between each measurement parameter and the decoding performance. The measurement parameter may indirectly reflect the decoding performance and thus may be used to represent the decoding performance. For example, in the case where the resource pool is composed of resource blocks, the number of user terminals (L) that each resource block may support is limited. All the user terminals may have the same or different priorities, and each user terminal randomly selects a resource block for data transmission. Data collisions and data packet loss may occur when the number of user terminals selecting the same resource block exceeds L. A user terminal encountering a decoding failure is required to perform data retransmission. As the number of user terminals with data transmission requirements increases, the number of user terminals encountering a decoding failure increases. In the case where a large number of user terminals exist within a service range of the base station, some or all of these user terminals may transmit data in the same time slot, which may result in increased resource contention. The resulting decoding failures may result in retransmission of excessive amount of data, which can increase congestion. When the number of user terminals encountering a decoding failure exceeds a certain threshold, the system performance deteriorates rapidly, resulting in a grant-free data transmission mode that cannot meet the requirement of the system. Although the number of user terminals existing in the service range of the base station may be determined according to registrations of the user terminals, these user terminals do not necessarily all transmit data in the same time slot, and the base station cannot accurately know how many user terminals are currently attempting to transmit data. Therefore, the number of registered user terminals or similar indicators cannot accurately reflect an actual situation of resource contention, and thus are not suitable for representing the decoding performance. What the base station can observe is an average number $\lambda$ of user terminals that transmit data in the same time including a single time slot or multiple consecutive time slots. In the case where the average number $\lambda$ is the average occurrence rate of the data transmission event, the number of occurrences of the data transmission event within a certain time may, for example, follow a Poisson distribution, and thus there is a relation between the average number $\lambda$ and the number of occurrences of the data transmission event within the certain time. It can be seen that the average $\lambda$ can reflect the actual situation of resource contention, and thus has a strong the relation with the number of successful decoding or the number of failed decoding. The average number may be obtained by counting the number of user terminals transmitting data in the time and averaging the number of user terminals in the time. The counted number of user terminals that transmit data in a single time slot may also be used as the average number. For example, the exemplary curves of FIG. 2 show relations between the accumulated number of user terminals encountering a decoding failure and the accumulated time under conditions of different average $\lambda$, where curve (a) shows a relation between the accumulated number of user terminals encountering a decoding failure and the accumulated time under conditions of different average $\lambda$ in 500 time slots, and curve (b) shows a relation between the accumulated number of user terminals encountering a decoding failure and the accumulated time under conditions of different average $\lambda$ in 50 time slots. Based on these relations, a correspondence between the average number $\lambda$ and the number of failed decoding may be determined, so that the average number $\lambda$ may indirectly represent the number of failed decoding, thereby indicating the decoding performance.

In step 107, it is determined if the evaluated decoding performance is below a threshold level. In the case where the data transmitted by the user terminal is not decoded successfully, the user terminal may perform data retransmission. In the case where the retransmission is successful, the decoding performance of the base station is not seriously degraded. However, if the resource contention is increased and thus the retransmission is failed, the first transmission failure and the retransmission failure are superimposed on each other, resulting in further increased resource contention and a rapidly increased signaling overhead. The threshold level is a specific example of a desired level. The threshold level may be set such that if the decoding performance is above the threshold level, the retransmission mechanism can not cause the decoding performance to deteriorate rapidly, and if the decoding performance is lower than the threshold level, the decoding performance is rapidly degraded due to the increased resource contention or the invalid retransmission mechanism. Such a threshold level is also referred to as a critical threshold level. The threshold level may be determined according to the measurement result of the decoding performance of the base station in various transmission requirements of user terminals, and the threshold level may also be set according to experience. In the case where a higher quality service is required, the threshold level may also be set to a level above the critical threshold level.

If it is determined in step 107 that the evaluated decoding performance is below the threshold level, then in step 109, at least one user terminal is switched to the grant mode for data transmission. The base station switches the user terminal to the grant mode via a signaling message so as to transmit data on a designated transmission resource (for example, resource block). Then, the method ends in step 111. If it is determined in step 107 that the evaluated decoding performance is not below a threshold level, the method 100 ends in step 111.

In the grant-free mode, the base station cannot know how many user terminals are to transmit data on which transmission resources, and thus cannot know accurate information about resource contention, and thus cannot reasonably determine a timing to switch the user terminal to the grant mode. According to the exemplary embodiment shown in FIG. 1, it is determined whether to switch the user terminal operating in a grant-free mode to the grant mode based on the decoding performance. Compared with other indicators, the decoding performance is an indicator that can more accurately reflect the degree of resource contention, and thus with the exemplary embodiment shown in FIG. 1, the timing to switch the user terminal to the grant mode can be determined more reasonably.

According to the exemplary embodiment of the present disclosure, the evaluated decoding performance may be determined according to an average number of user terminals accessing the base station within a predetermined time, or may be determined according to the accumulated number of user terminals encountering a decoding failure within a predetermined time.

Figure 3:
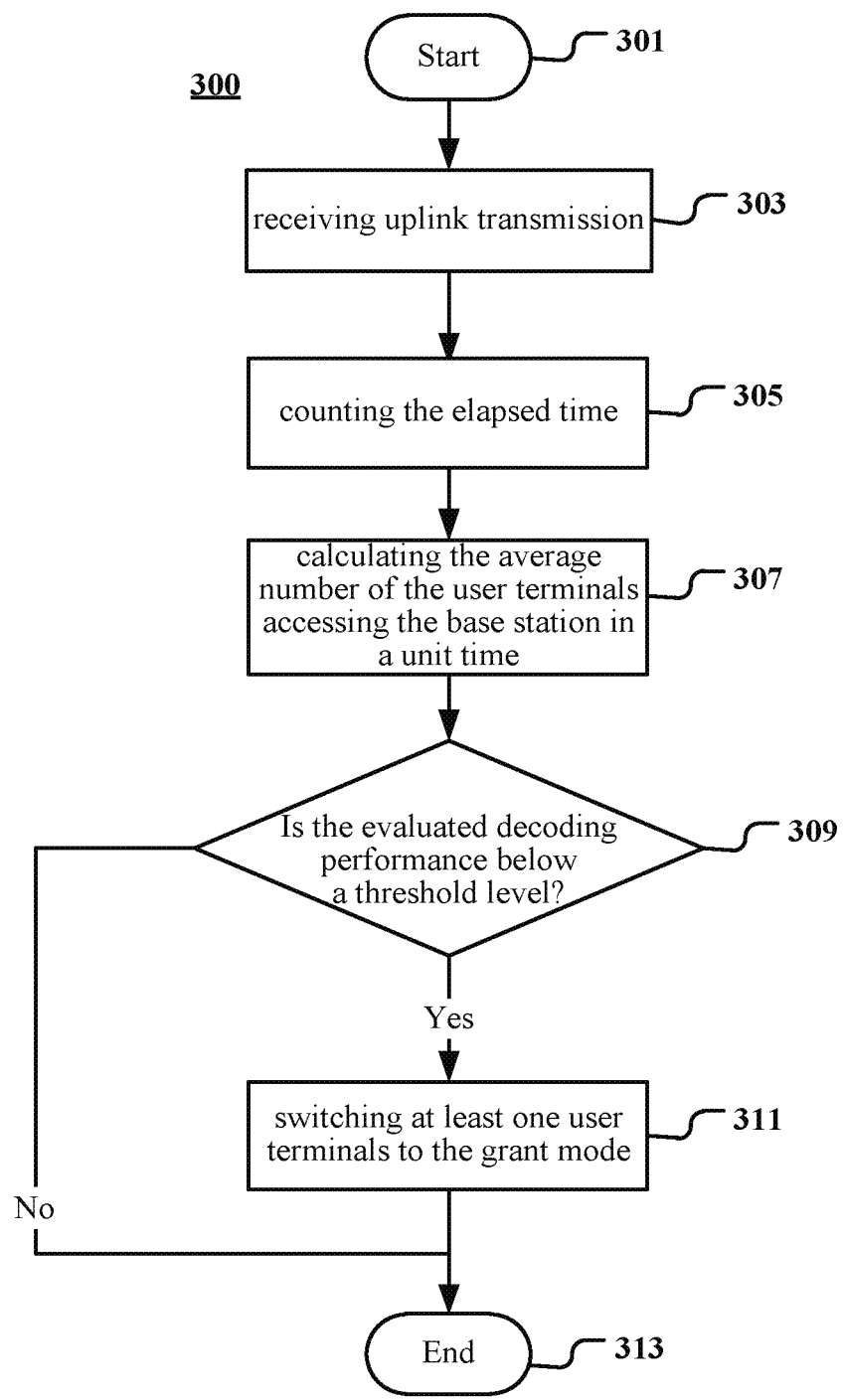
FIG. 3 is a flowchart of a method of wireless communication between a base station and user terminals according to an exemplary embodiment of the present disclosure.

FIG. 3 is a flowchart of a method 300 of wireless communication between a base station and user terminals according to an exemplary embodiment of the present disclosure.

As shown in FIG. 3, the method starts from step 301. In step 303, the base station receives uplink transmissions from user terminals of the same type. The user terminals operate in a grant-free mode. In an example, the user terminals may have the same priority. In another example, the user terminals may have different priorities.

In step 305, the base station counts an elapsed time t.

In step 307, for the current time t, the base station calculates an average number 40 of user terminals accessing the base station within a predetermined time as the evaluated decoding performance. Since the user terminals operate in the grant-free mode, the accessing the base station refers to a behavior in which the user terminals directly transmit data on the transmission resource. The threshold level may be a maximum average number, where the accumulated number of user terminals encountering a decoding failure corresponding to the counted time is higher than a threshold number, and the accumulated number is obtained according to a relation on condition of an average number larger than the maximum average number, among a relation of the counted time and the accumulated number of user terminals encountering a decoding failure on condition of different average numbers of the first type user terminals accessing the base station during a unit time. For example, for the current time t, the maximum average number $\lambda_{max}(t)$ is determined as the threshold level Th(t) as follows:

$$\lambda_{max}(t)=\text{argmax}_{\lambda_1}(f_{\lambda_1}(t)<Th_{num}), i=1,\ldots,N \quad (1)$$

where $Th_{num}$ indicates a maximum accumulated number of users encountering a decoding failure allowed by the system. For example, $Th_{num}$ may indicate an accumulated number of users encountering a decoding failure corresponding to a lowest decoding performance that the system can withstand, or an accumulated number of users encountering a decoding failure set according to experience or quality of service requirements. $F_{\lambda,1}(t)$ indicates a relation between the counted time t and the accumulated number of users encountering a decoding failure on condition of the average number $\lambda$ of user terminals accessing the base station per unit time. The curves shown in FIG. 2 are examples of these relations. According to equation (1), the accumulated number of users encountering a decoding failure corresponding to the counted time t obtained from the relation $f_{\lambda,p}(t)$ on condition of the average number $\lambda p$ that is larger than the maximum average number $\lambda_{max}(t)$ is higher than the threshold number $Th_{num}$.

In step 309, it is determined if the evaluated decoding performance is below a threshold level.

If it is determined in step 309 that the evaluated decoding performance is below the threshold level, then in step 311, at least one user terminal is switched to the grant mode for data transmission. Then, the method 300 ends in step 313. If it is determined in step 309 that the evaluated decoding performance is not below the threshold level, the method 300 ends in step 313.

Figure 4:
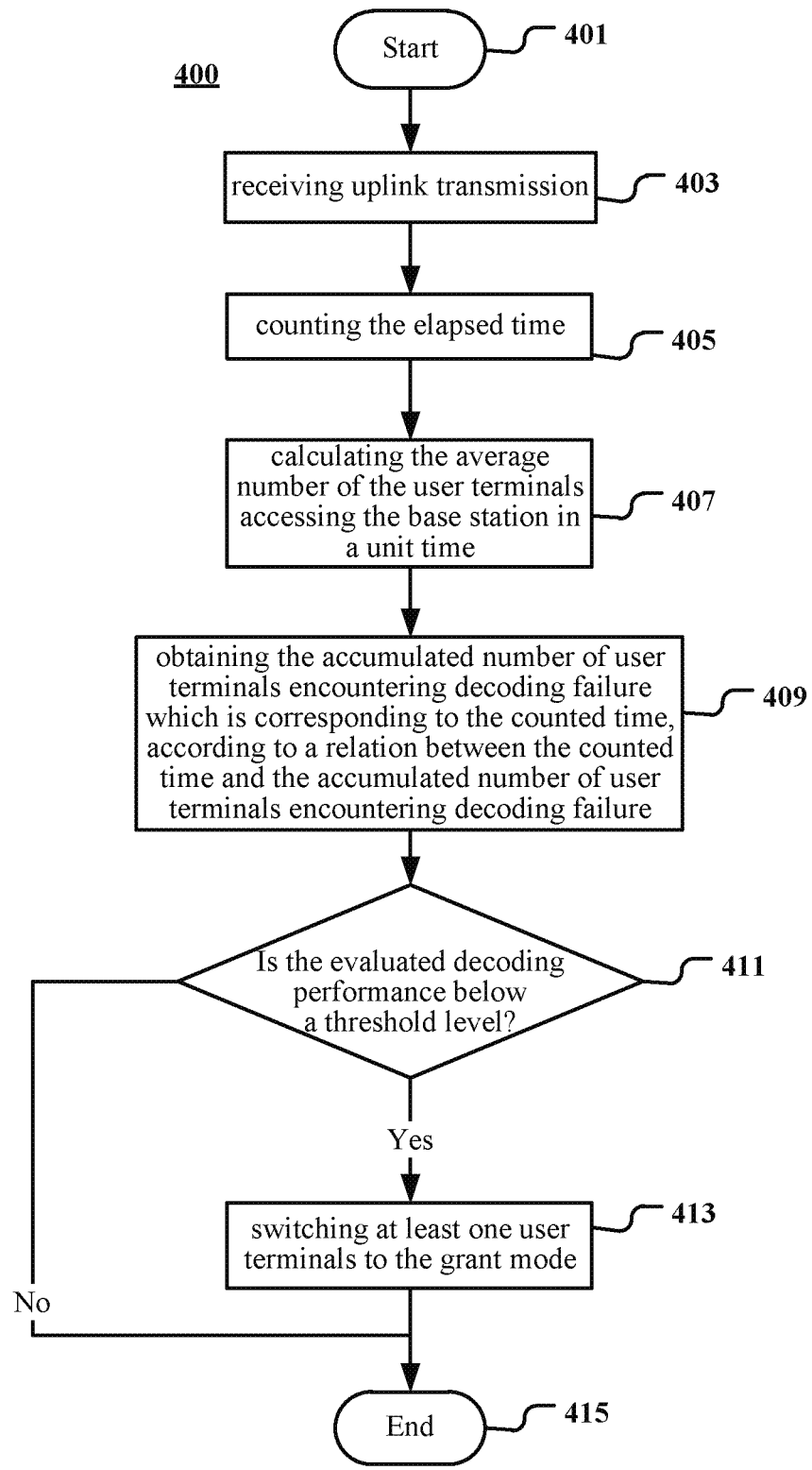
FIG. 4 is a flowchart of a method of wireless communication between a base station and user terminals according to an exemplary embodiment of the present disclosure.

FIG. 4 is a flowchart of a method 400 of wireless communication between a base station and user terminals according to an exemplary embodiment of the present disclosure.

As shown in FIG. 4, the method starts from step 401. In step 403, the base station receives uplink transmissions from user terminals of the same type. The user terminals operate in a grant-free mode. In an example, the user terminals may have the same priority. In another example, the user terminals may have different priorities.

In step 405, the base station counts an elapsed time t.

In step 407, for the current time t, the base station calculates an average number $\lambda(t)$ of user terminals accessing the base station within a predetermined time.

In step 409, the accumulated number $F_{num}(t)$ of users encountering a decoding failure corresponding to the counted time t is obtained according to the relation $f_{\lambda(t)}(t)$ between the counted time t and the accumulated number of users encountering a decoding failure on condition of the average number 40, as the evaluated decoding performance. The threshold level is the maximum accumulated number of users encountering a decoding failure allowed by the system. For example, the threshold level may be an accumulated number of users encountering a decoding failure corresponding to the lowest decoding performance that the system can withstand, or an accumulated number of users encountering a decoding failure set according to experience or quality of service requirements.

In step 411, it is determined whether the evaluated decoding performance is below the threshold level.

If it is determined in step 411 that the evaluated decoding performance is below the threshold level, in step 413, at least one of the user terminals is switched to a grant mode for data transmission. Then, the method 400 ends in step 415. If it is determined in step 411 that the evaluated decoding performance is not below the threshold level, the method 400 ends in step 415.

In a further embodiment of the above embodiment, a maximum counted time may be set. If the current counted time exceeds the maximum counted time and the evaluated decoding performance is not below the threshold level, the time counting is restarted.

In the grant-free mode, the user terminal selects a transmission resource from a resource pool allocated for the grant-free mode for transmission. The number of transmission resources contained in the resource pool may affect a degree of resource contention. Therefore, there is a difference in the relation between the counted time and the accumulated number of users encountering a decoding failure on condition of different capacities of the resource pool. In a further embodiment of the above embodiment, the relation between the counted time and the accumulated number of users encountering a decoding failure includes a relation $f_{\lambda(t), Rnum}(t)$ between the counted time and the accumulated number of users encountering a decoding failure on condition of the average number $\lambda(t)$ and the resource amount $R_{num}$ available for the grant-free uplink transmission of the user terminal. Accordingly, the maximum average number $\lambda_{max}(t)$ or the accumulated number $F_{num}(t)$ of users encountering a decoding failure is determined according to the relation $f_{\lambda(t), Rnum}(t)$ on condition of the average number $\lambda(t)$ and the resource amount $R_{num}$.

Figure 5:
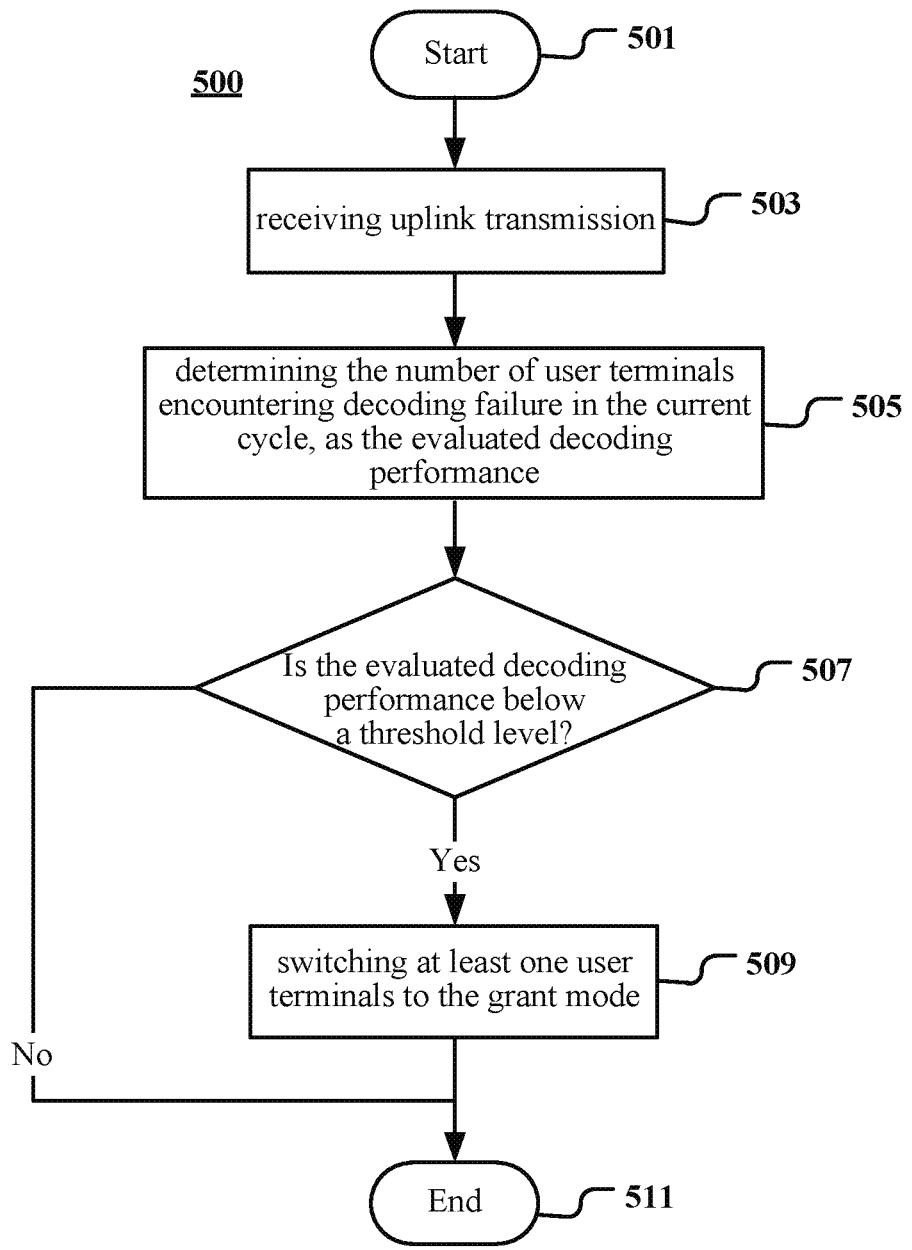
FIG. 5 is a flowchart of a method of wireless communication between a base station and user terminals according to an exemplary embodiment of the present disclosure.

FIG. 5 is a flowchart of a method 500 of wireless communication between a base station and user terminals according to an exemplary embodiment of the present disclosure.

As shown in FIG. 5, the method 500 starts from step 501. In step 503, the base station receives uplink transmissions from user terminals of the same type. The user terminals operate in a grant-free mode. In an example, the user terminals may have the same priority. In another example, the user terminals may have different priorities.

In step 505, the number of user terminals encountering a decoding failure in the grant-free uplink transmission of the current cycle, that is, the accumulated number $F_{num}$ of users encountering a decoding failure is counted as the evaluated decoding performance. A cycle may include a single time slot, and may also include multiple consecutive time slots, for example, two, three or more time slots.

In step 507, it is determined whether the evaluated decoding performance is below a threshold level. The threshold level may be, for example, the maximum accumulated number of users encountering a decoding failure in a cycle allowed by the system. For example, the threshold level may be the accumulated number of users encountering a decoding failure in one cycle corresponding to the lowest decoding performance that the system can withstand, or the accumulated number of users encountering a decoding failure in one cycle set according to experience or quality of service requirements.

If it is determined in step 507 that the evaluated decoding performance is below the threshold level, in step 509, at least one of the user terminals is switched to a grant mode for data transmission. Then, the method 500 ends in step 511. If it is determined in step 507 that the evaluated decoding performance is not below the threshold level, the method 500 ends in step 511.

According to an exemplary embodiment of the present disclosure, in the case where it is determined that the evaluated decoding performance is below the threshold level, at least one of the user terminals is switched to the grant mode. The at least one user terminal to be switched may include some or all of the user terminals of the same type that operate in the grant-free mode. The number of user terminals to be switched to the grant mode may also be determined according to the evaluated decoding performance. For example, if the evaluated decoding performance is low or substantially lower than the threshold level, the number of user terminals to be switched to the grant mode may be relatively large, and vice versa.

Figure 6:
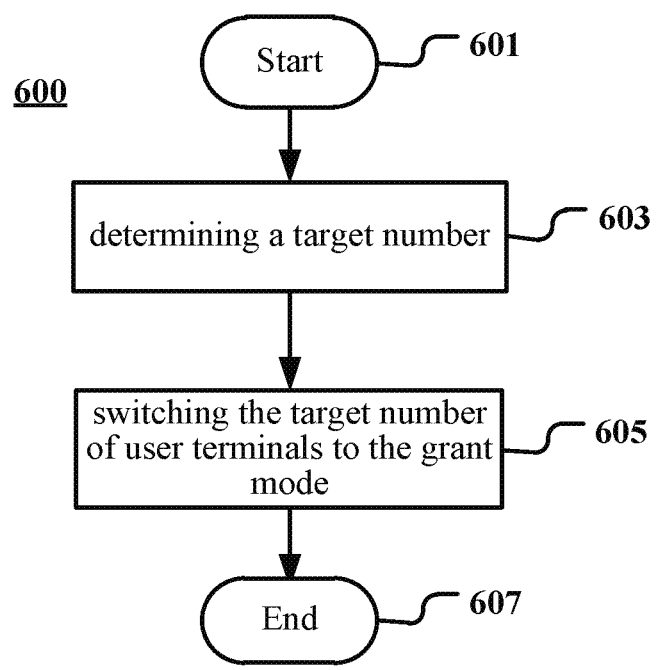
FIG. 6 is a flowchart of an exemplary process of a switching step according to an exemplary embodiment of the present disclosure.

Preferably, the number of user terminals to be switched to the grant mode may also be determined by taking a desired decoding performance as a target. In an example, a target number may be determined such that a decoding performance for the grant-free mode is not below the threshold level after the target number of user terminals are switched to the grant mode, and the target number of the user terminals are switched to the grant mode. In another example, a minimum number such that the decoding performance for the grant-free mode is not below the threshold level after the minimum number of user terminals are switched to the grant mode may be determined as the target number, and the target number of user terminals are switched to the grant mode. FIG. 6 is a flowchart of an exemplary process 600 of a switching step according to an exemplary embodiment of the present disclosure.

As shown in FIG. 6, the process 600 starts from step 601. In step 603, a target number that meets the following condition is determined: the estimated decoding performance for the grant-free uplink transmission after the target number of user terminals are switched to the grant mode is not below the threshold level. For example, the target number may be determined according to the relation between the number of user terminals that are switched to the grant mode and a corresponding degree of improvement in decoding performance, such that when the target number of user terminals are switched to the grant mode, the obtained decoding performance is expected to be higher than the threshold level. The relation between the number of user terminals that are switched to the grant mode and the corresponding degree of improvement in decoding performance may be determined according to theoretical calculations, empirical values, or actual measurements.

In step 605, the target number of user terminals are switched to the grant mode. Then, the process 600 ends in step 607.

Figure 7:
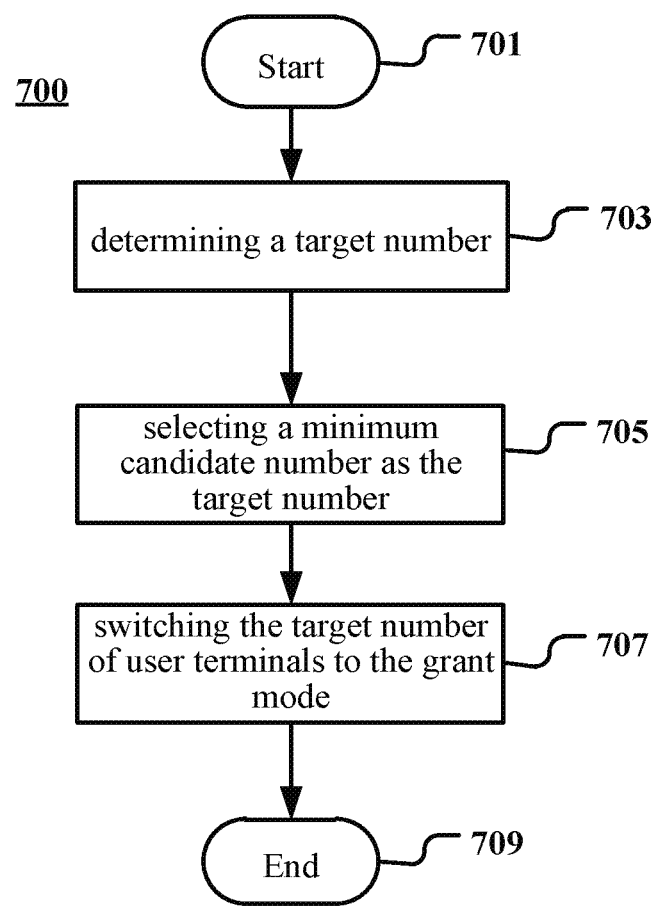
FIG. 7 is a flowchart of an exemplary process of a switching step according to an exemplary embodiment of the present disclosure.

FIG. 7 is a flowchart of an exemplary process 700 of a switching step according to an exemplary embodiment of the present disclosure.

As shown in FIG. 7, the process 700 starts from step 701. In step 703, a candidate number that meets the following condition is determined: the estimated decoding performance for the grant-free uplink transmission after a candidate number of user terminals are switched to the grant mode is not lower than the threshold level. For example, the candidate number may be determined according to the relation between the number of user terminals that are switched to the grant mode and the corresponding degree of improvement in decoding performance, such that when the candidate number of user terminals are switched to the grant mode, the obtained decoding performance is expected to be higher than the threshold level. The relation between the number of user terminals that are switched to the grant mode and the corresponding degree of improvement in decoding performance may be determined according to theoretical calculations, empirical values, or actual measurements.

In step 705, a minimum candidate number is selected as the target number.

In step 707, the target number of user terminals are switched to the grant mode. Then, the process 700 ends in step 709. During the process 700 is performed, the candidate number may be determined in a descending order. In this order, if a current candidate number meets the condition, the candidate number is directly selected as the target number.

In an exemplary embodiment, the target number or the candidate number may be calculated from a scale factor $\alpha$. For example, if the number of user terminals transmitting data before the switching is N, the target number or the candidate number may be calculated as $\alpha \times N$.

Figure 8:
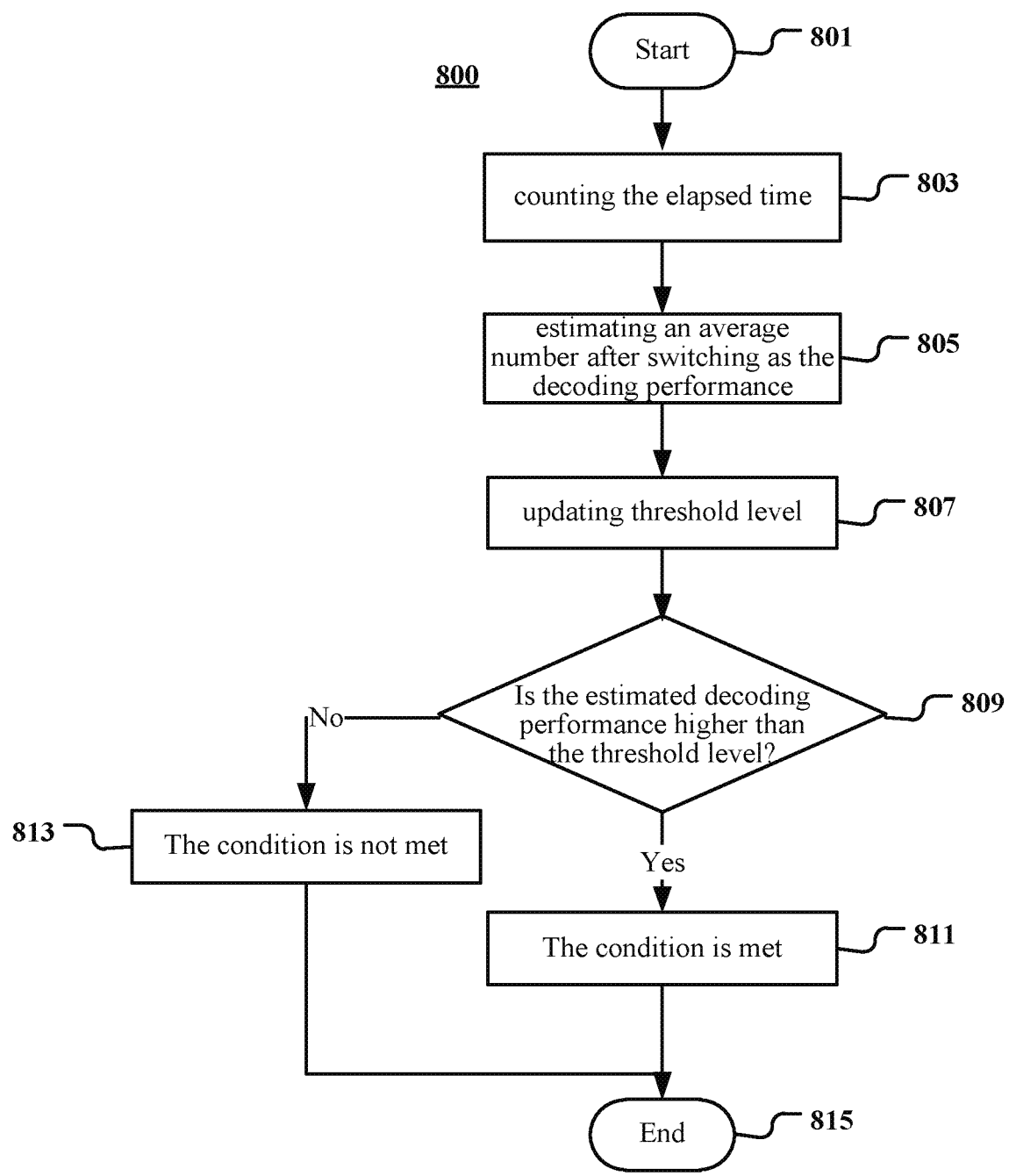
FIG. 8 is a flowchart of an exemplary process of determining whether a condition that a decoding performance is higher than a threshold level after a number M of user terminals are switched is met, according to an exemplary embodiment of the present disclosure.

FIG. 8 is a flowchart showing an exemplary process 800 for determining whether a condition that a decoding performance after a number M of user terminals are switched is higher than a threshold level is met, according to an exemplary embodiment of the present disclosure.

As shown in FIG. 8, the process 800 starts from step 801. In step 803, an elapsed time t is counted.

In step 805, an average number $\lambda$new of the remaining user terminals is calculated as the evaluated decoding performance after the switching based on the user terminals remained after the switching. After the switching, the number of users accessing the base station for the grant-free mode is reduced. Additionally or alternatively, the amount of resources $R_{num}$ available for the grant-free uplink transmission of the user terminals is also reduced, for example, the base station reallocates the resources for the grant-free transmission to the user terminals that are switched to the grant mode. In an example, assuming that the number of user terminals transmitting data before the switching is N, the number of remaining user terminals after the switching is N-M. The time average may be performed on the number N-M to obtain an average number $\lambda$new. In the case where the target number or the candidate number is calculated using the scale factor $\alpha$, the average number $\lambda$new may be calculated as $\alpha \times \lambda$, where $\lambda$ indicates an average number before the switching. As described above, the target number or the candidate number may be determined according to the relation between the number of user terminals that are switched to the grant mode and the corresponding degree of improvement in decoding performance. For example, on condition of the average number $\lambda$new of the user terminals accessing the base station per unit time and the amount of resources $R_{num}$ available for the grant-free uplink transmission of the user terminals after the switching, the relation $f_{\lambda new, Rnum}(t)$ between the counted time t and the accumulated number of users encountering a decoding failure described in the above embodiment in conjunction with FIG. 4 may reflect the relation between the number of user terminals that are switched to the grant mode and the corresponding degree of improvement in decoding performance. Thus, the estimated decoding performance may be indirectly reflected by the average number $\lambda$new.

In step 807, the threshold level is updated to be the maximum average number $\lambda_{newmax}(t)$. For example, the maximum average $\lambda_{newmax}(t)$ may be determined as follows:

$$\lambda_{newmax}(t) = \mathrm{argmax}_{\lambda newi}(f_{\lambda newi, Rnum}(t) < Th_{num}), i=1, \ldots, N \quad (2)$$

where $Th_{num}$ indicates the maximum accumulated number of users encountering a decoding failure allowed by the system. $F_{\lambda newi, Rnum}(t)$ indicates a relation between the counted time t and the accumulated number of users encountering a decoding failure on condition of the average number $\lambda_{newi}$ of user terminals accessing the base station per unit time after the switching. According to equation (2), the accumulated number of users encountering a decoding failure corresponding to the counted time t obtained according to the relation $f_{\lambda p, Rnum}(t)$ which is on condition of the average number λp that is larger than the maximum average number $\lambda_{newmax}(t)$ is higher than the threshold number $Th_{num}$.

In step 809, it is determined whether the calculated average number λnew is above the updated threshold level $\lambda_{newmax}(t)$. If the average number λnew is above the updated threshold level $\lambda_{newmax}(t)$, in step 813, it is determined that the condition is not met and the process 800 ends in step 815. If the average number λnew is not above the updated threshold level $\lambda_{newmax}(t)$, then in step 811, it is determined that the condition is met and the process 800 ends in step 815.

Figure 9:
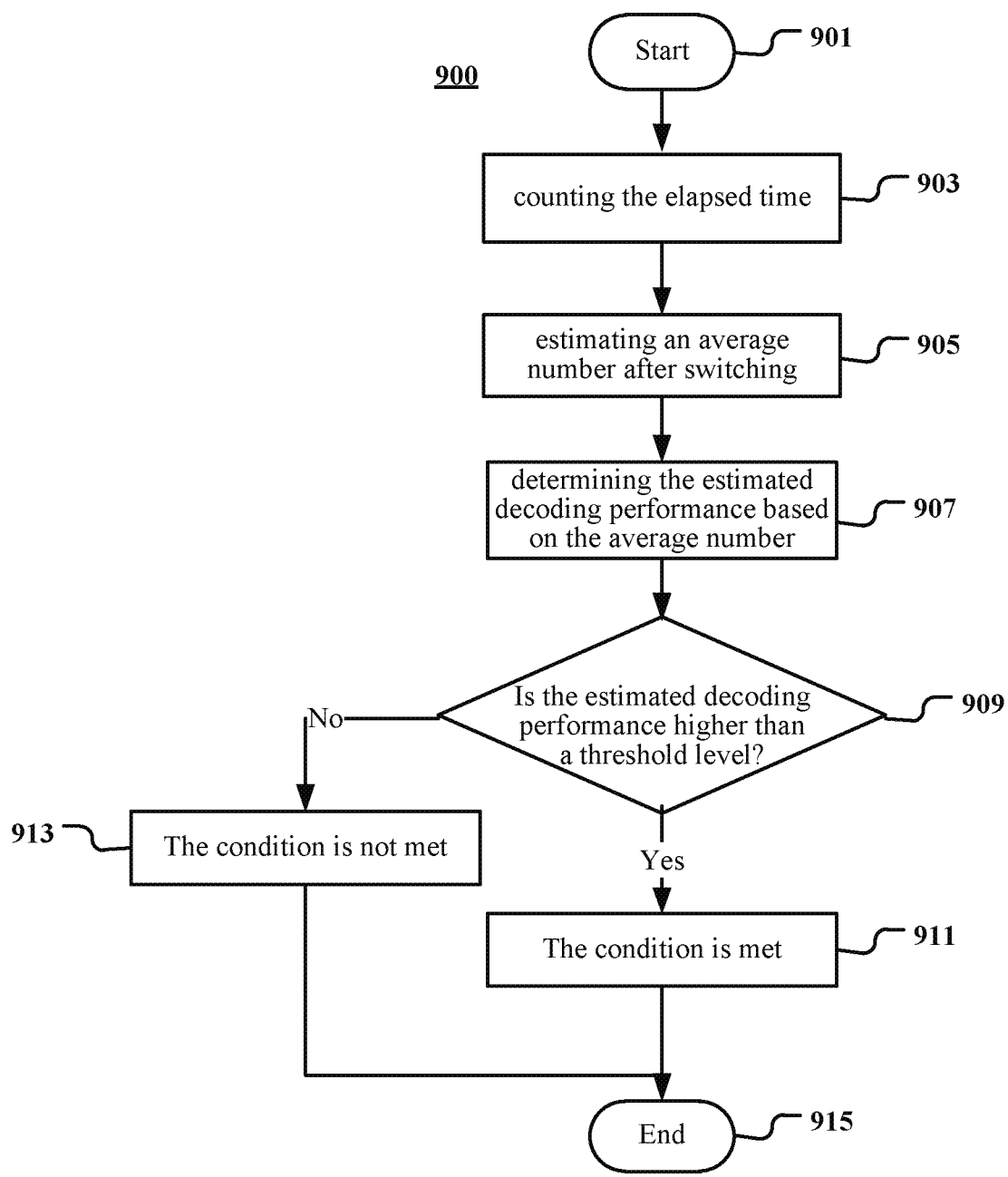
FIG. 9 is a flowchart of an exemplary process of determining whether a condition that a decoding performance is higher than a threshold level after a number M of user terminals are switched is met, according to an exemplary embodiment of the present disclosure.

FIG. 9 is a flowchart showing an exemplary process 900 for determining whether a condition that a decoding performance after a number M of user terminals are switched is above a threshold level is met, according to an exemplary embodiment of the present disclosure.

As shown in FIG. 9, the process 900 starts from step 901. In step 903, an elapsed time t is counted.

In step 905, the average number λnew of remaining user terminals is calculated based on the remaining user terminals after the switching. After the switching, the number of user terminals accessing the base station for the grant-free mode is reduced. Additionally or alternatively, the amount of resources $R_{num}$ available for the grant-free uplink transmission of the user terminals is also reduced, for example, the base station reallocates the resources for the grant-free transmission to the user terminals that are switched to the grant mode. In an example, assuming that the number of user terminals transmitting data before the switching is N, the number of the remaining user terminals after the switching is N−M. The time average may be performed on the number N−M to obtain the average number λnew. In the case where the target number or the candidate number is calculated using the scale factor α, the average number λnew may be calculated as α×λ, where λ indicates the average number before the switching.

In step 907, the accumulated number of users encountering a decoding failure corresponding to the counted time t is obtained according to the relation $f_{\lambda new,Rnum}(t)$ between the counted time t and the accumulated number of users encountering a decoding failure on condition of the average number λnew of user terminals accessing the base station per unit time and the amount of resources $R_{num}$ available to the user terminals for grant-free uplink transmission after the switching, as the estimated decoding performance.

In step 909, it is determined whether the estimated decoding performance is above a threshold level. If the estimated decoding performance is not above the threshold level, in step 913, it is determined that the condition is not met and the process 900 ends in step 915. If the estimated decoding performance is above the threshold level, then in step 911, it is determined that the condition is met and the process 900 ends in step 915.

In order to provide services of various qualities more flexibly, user terminals operating in the grant-free mode may have different priorities.

Figure 10:
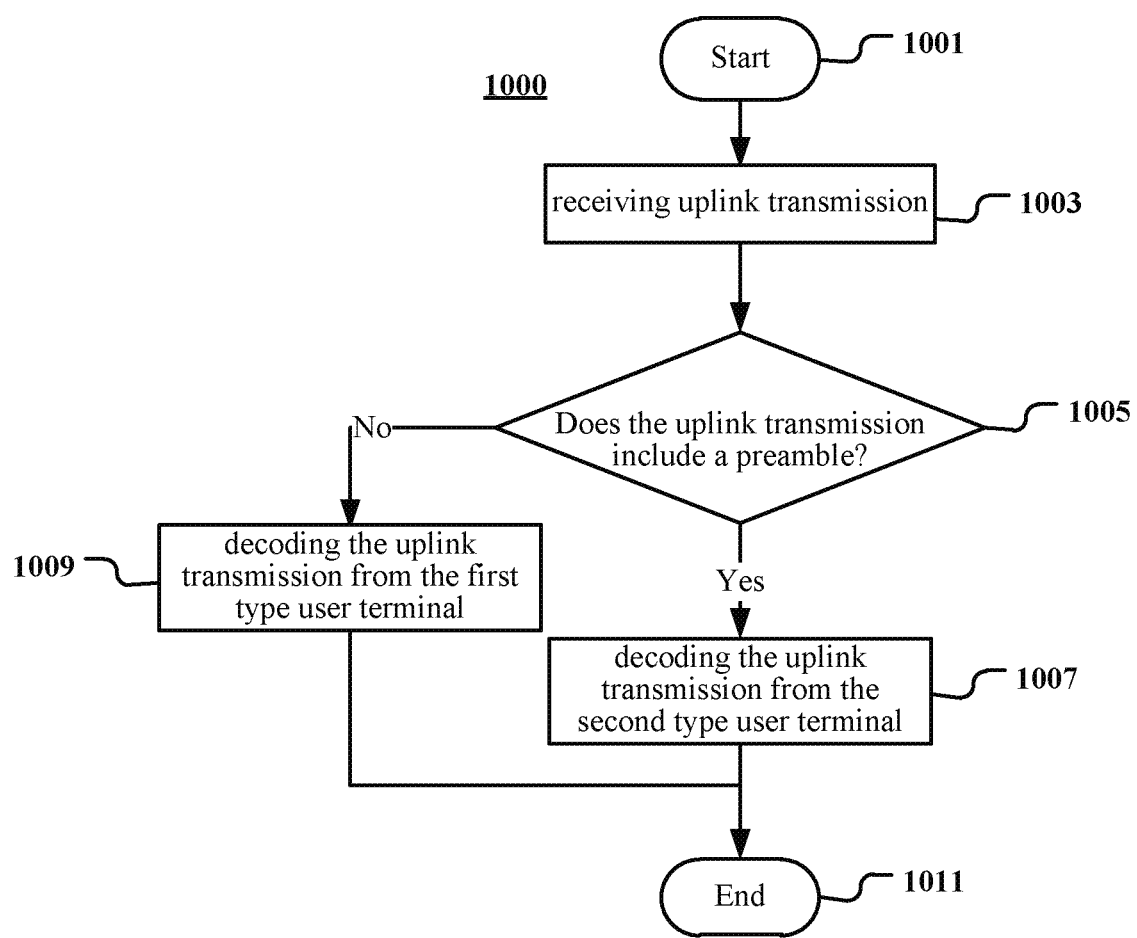
FIG. 10 is a flowchart of a method of wireless communication between a base station and user terminals according to an exemplary embodiment of the present disclosure, where the user terminals have different priorities.

FIG. 10 is a flowchart showing a method 1000 of wireless communication between a base station and user terminals according to an exemplary embodiment of the present disclosure, where the user terminals have different priorities.

As shown in FIG. 10, the method 1000 starts from step 1001. In step 1003, the base station receives uplink transmissions from the user terminals. The user terminals may be first type user terminals with a first priority and operating in a grant-free mode, or second type user terminals with a second priority and operating in the grant-free mode, where the first priority is lower than the second priority. The uplink transmission from the second type user terminal includes a preamble and data following the preamble. The preamble includes an identification for the second type user terminal transmitting the preamble.

Various reference signals may be designed to serve as the preambles described herein. For example, in the proposal R1-168325 WF on MA resource clarification ZTE, ZTE Microelectronics, Qualcomm, it is designed for the multiple access (MA) that identification for the multiple access includes at least one of the following: codebook/code word, sequence, interrelation, demodulation reference signal, preamble, and the like. The preamble described in this proposal may be used as the preamble described herein. In an example, the first type user terminal may be an mMTC user terminal and the second type user terminal may be a URLLC user terminal. The two type user terminals may both operate in the grant-free mode and share a resource pool for the grant-free mode.

In step 1005, it is determined whether the received uplink transmission includes a preamble. Since the uplink transmission from the first type user terminal does not include a preamble, the uplink transmission from the second type user terminal includes a preamble, it may be determined whether the uplink transmission is from the first type user terminal or the second type user terminal by determining whether the received uplink transmission includes the preamble.

If the uplink transmission does not include the preamble, in step 1009, it is determined that the uplink transmission is from the first type user terminal and the received uplink transmission is decoded. If the uplink transmission includes the preamble, in step 1007, it is determined that the uplink transmission is from the second type user terminal and the received uplink transmission is decoded. After performing step 1007 and step 1009, the method 1000 ends in step 1011.

Figure 11:
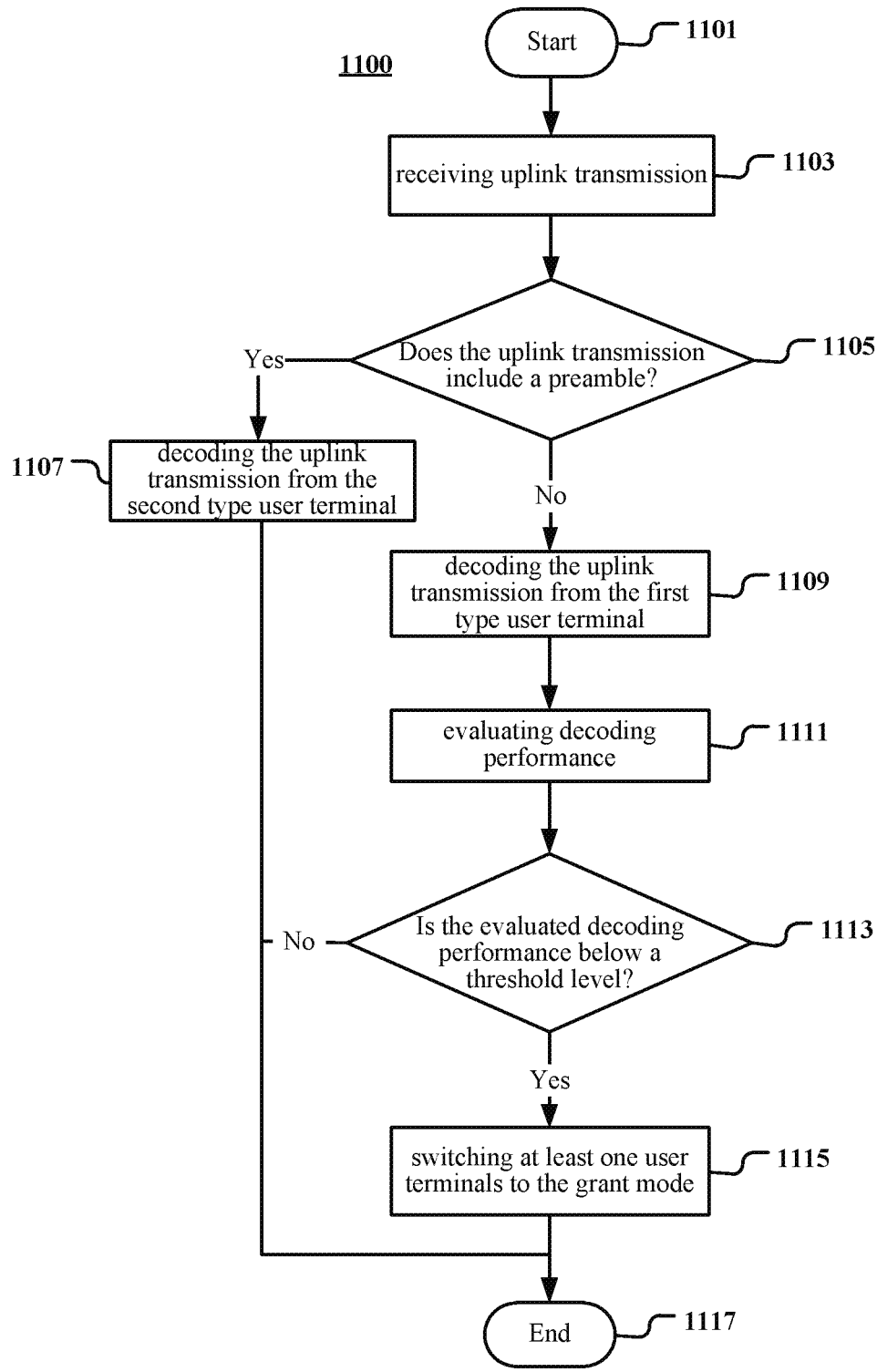
FIG. 11 is a flowchart of a method of wireless communication between a base station and user terminals according to an exemplary embodiment of the present disclosure, where the user terminals have different priorities.

FIG. 11 is a flowchart showing a method 1100 of wireless communication between a base station and user terminals according to an exemplary embodiment of the present disclosure, where the user terminals have different priorities.

As shown in FIG. 11, the method 1100 starts from step 1101. In step 1103, the base station receives uplink transmissions from the user terminals. The user terminal may be a first type user terminal with a first priority and operating in a grant-free mode, or a second type user terminal with a second priority and operating in the grant-free mode, where the first priority is lower than the second priority. The uplink transmission from the second type user terminal includes a preamble and data following the preamble. The preamble includes an identification for the second type user terminal transmitting the preamble.

In step 1105, it is determined whether the received uplink transmission includes the preamble.

If the uplink transmission does not include the preamble, in step 1109, it is determined that the uplink transmission is from the first type user terminal and the received uplink transmission is decoded. Next, in step 1111, the base station evaluates a decoding performance of the received uplink transmission. In step 1113, it is determined whether the evaluated decoding performance is below the threshold level. If it is determined in step 1113 that the evaluated decoding performance is below the threshold level, in step 1115, at least one first type user terminal is switched to the grant mode for data transmission. Then, the method 1100 ends in step 1117. If it is determined in step 1113 that the evaluated decoding performance is not below the threshold level, the method 1100 ends in step 1117.

If it is determined in step 1105 that the uplink transmission includes the preamble, in step 1107, it is determined that the uplink transmission is from the second type user terminal and the received uplink transmission is decoded. Then, the method 1100 ends in step 1117.

According to the embodiment shown in FIG. 11, if the decoding performance of the uplink transmission of a user terminal with a low priority is low, some or all of user terminals with a low priority may be switched to the grant mode to avoid aggravate resource contention caused by a large number of retransmissions, and to avoid quality of service to user terminals with a high priority from being affected.

In a further embodiment of the embodiment shown in FIG. 11, the steps of evaluating the decoding performance and/or performing the switching may be performed using the method described above.

Figure 12:
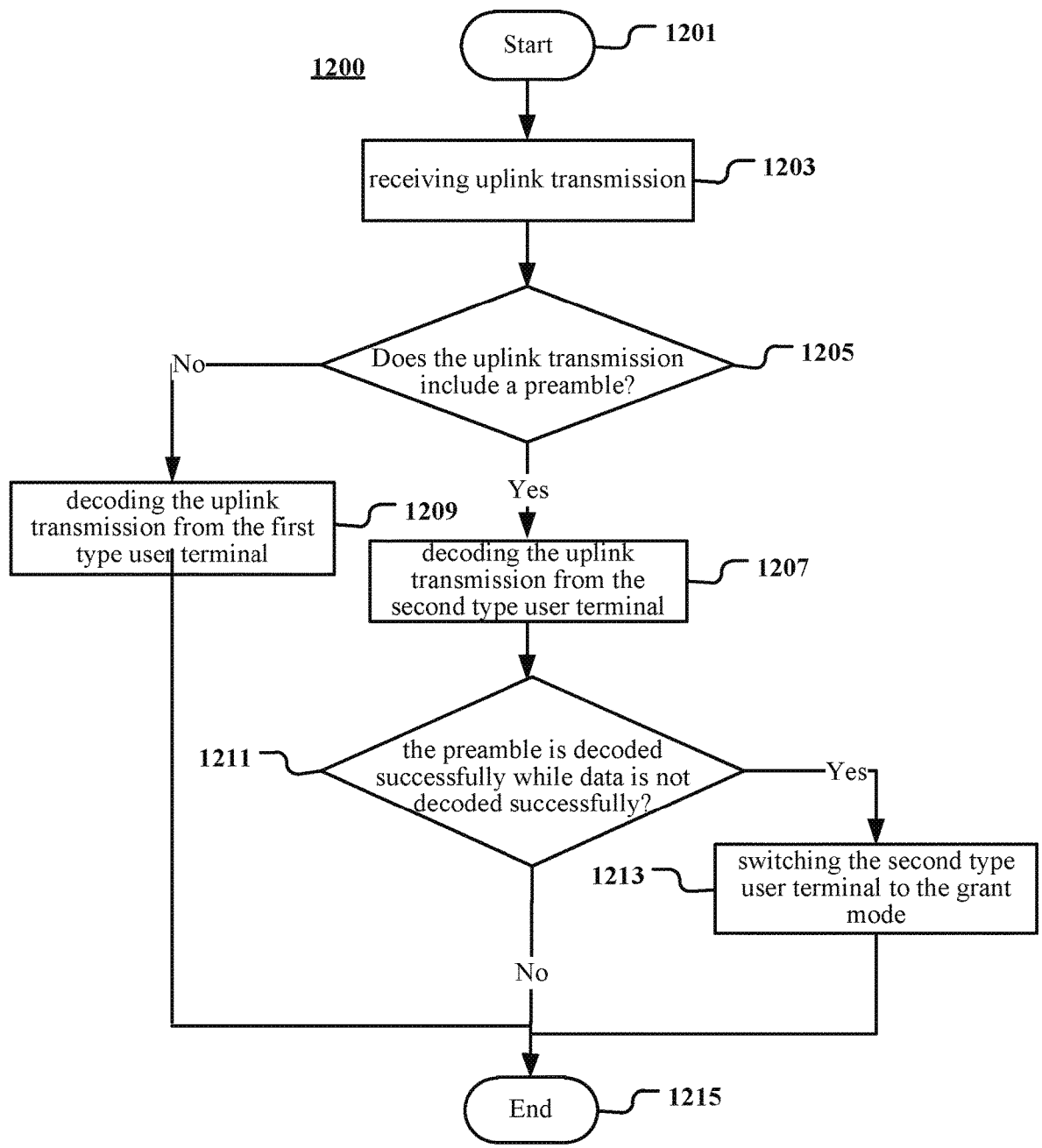
FIG. 12 is a flowchart of a method of wireless communication between a base station and user terminals according to an exemplary embodiment of the present disclosure, where the user terminals have different priorities.

FIG. 12 is a flowchart showing a method 1200 of wireless communication between a base station and user terminals according to an exemplary embodiment of the present disclosure, where the user terminals have different priorities.

As shown in FIG. 12, the method 1200 starts from step 1201. In step 1203, the base station receives uplink transmissions from the user terminals. The user terminal may be a first type user terminal with a first priority and operating in a grant-free mode, or a second type user terminal with a second priority and operating in the grant-free mode, where the first priority is lower than the second priority. The uplink transmission from the second type user terminal includes a preamble and data following the preamble. The preamble includes an identification for the second type user terminal transmitting the preamble.

In step 1205, it is determined whether the received uplink transmission includes the preamble.

If the uplink transmission includes the preamble, in step 1207, it is determined that the uplink transmission is from the second type user terminal and the received uplink transmission is decoded. Next, in step 1211, it is determined whether the following condition is met: the preamble in the uplink transmission is successfully decoded and the data in the uplink transmission is not decoded successfully. If the condition is met, the second type user terminal transmitting the uplink transmission is switched to the grant mode in step 1213, and the method 1200 ends in step 1215. If it is determined in step 1211 that the condition is not met, the method 1200 ends in step 1215.

If it is determined in step 1205 that the uplink transmission does not include the preamble, in step 1209, it is determined that the uplink transmission is from the first type user terminal and the received uplink transmission is decoded. Then, the method 1200 ends in step 1215.

According to the embodiment shown in FIG. 12, if a preamble in an uplink transmission of a user terminal with a high priority is decoded successfully and data is not decoded successfully, the user terminal may be switched to the grant mode to ensure the quality of service.

In a further embodiment of the embodiment shown in FIG. 12, steps 1111, 1113 and 1115 in the embodiment of FIG. 11 may be inserted between steps 1209 and 1215.

Figure 13:
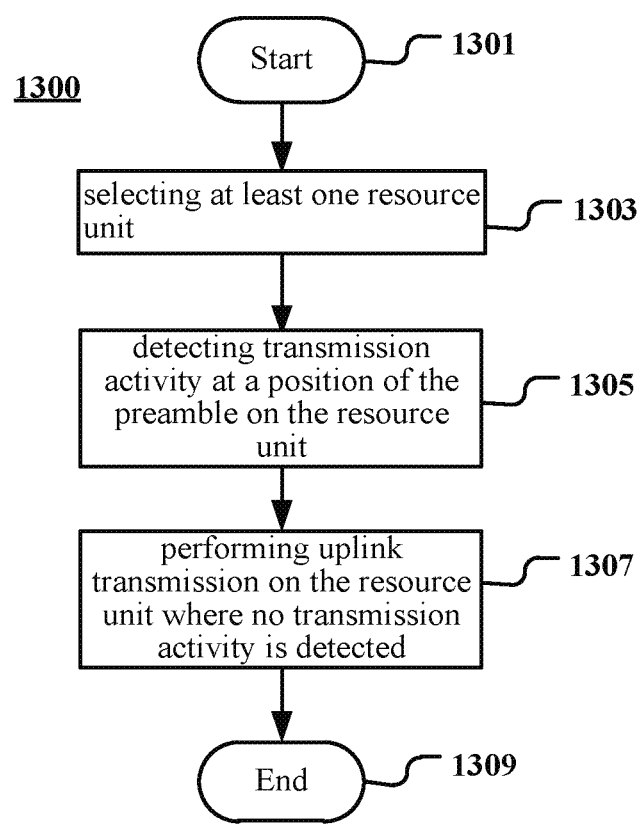
FIG. 13 is a flowchart of a method of grant-free uplink transmission on a user terminal according to an exemplary embodiment of the present disclosure.

FIG. 13 is a flowchart showing a method 1300 of grant-free uplink transmission on a user terminal according to an exemplary embodiment of the present disclosure.

As shown in FIG. 13, the method 1300 starts from step 1301. In step 1303, at least one resource unit is selected from a resource pool for the grant-free uplink transmission. In step 1305, a transmission activity at a preamble on the selected resource unit is detected. As described above, user terminals operating in the grant-free mode may have different priorities in order to provide more flexibly various qualities of services. A user terminal with a low priority does not transmit a preamble before transmitting data, and a user terminal with a high priority transmits both a preamble and following data. A user terminal operating in the grant-free mode needs to detect whether there is a transmission activity at a corresponding preamble on a selected resource unit before using the resource unit. If there is no transmission activity, it is indicated that no preamble exists on the resource unit, and thus the resource unit may be determined to be idle and available for uplink transmission. If a transmission activity is detected at the corresponding preamble on the resource unit, it indicates that the resource unit may be occupied by other user terminals transmitting a preamble or signal transmission of other devices, so that the resource unit is currently unavailable for uplink transmission. The transmission activity may be detected by, for example, detecting signal power or energy over time and/or on frequency resources.

In step 1307, uplink transmission is performed on a resource unit where no transmission activity is detected. Then, the method 1300 ends in step 1309.

According to the embodiment shown in FIG. 13, a user terminal with a low priority detects whether a resource unit is occupied before performing uplink transmission on the resource unit, and performs uplink transmission on the resource unit in the case where the resource unit is not determined to be occupied. This can reduce the possibility that a user terminal with a low priority interferes with an uplink transmission of a user terminal with a high priority.

In a further embodiment of the embodiment shown in FIG. 13, if there is more than one resource unit where no transmission activity is detected, the resource unit may be randomly determined from the resource units where no transmission activity is detected, and an uplink transmission is performed on the determined resource unit.

In a further embodiment of the embodiment shown in FIG. 13, if transmission activity is detected at a a preamble on each of all selected resource units in a current cycle, no uplink transmission is performed in the current cycle, and the steps shown in FIG. 13 are performed in a next cycle.

Figure 14:
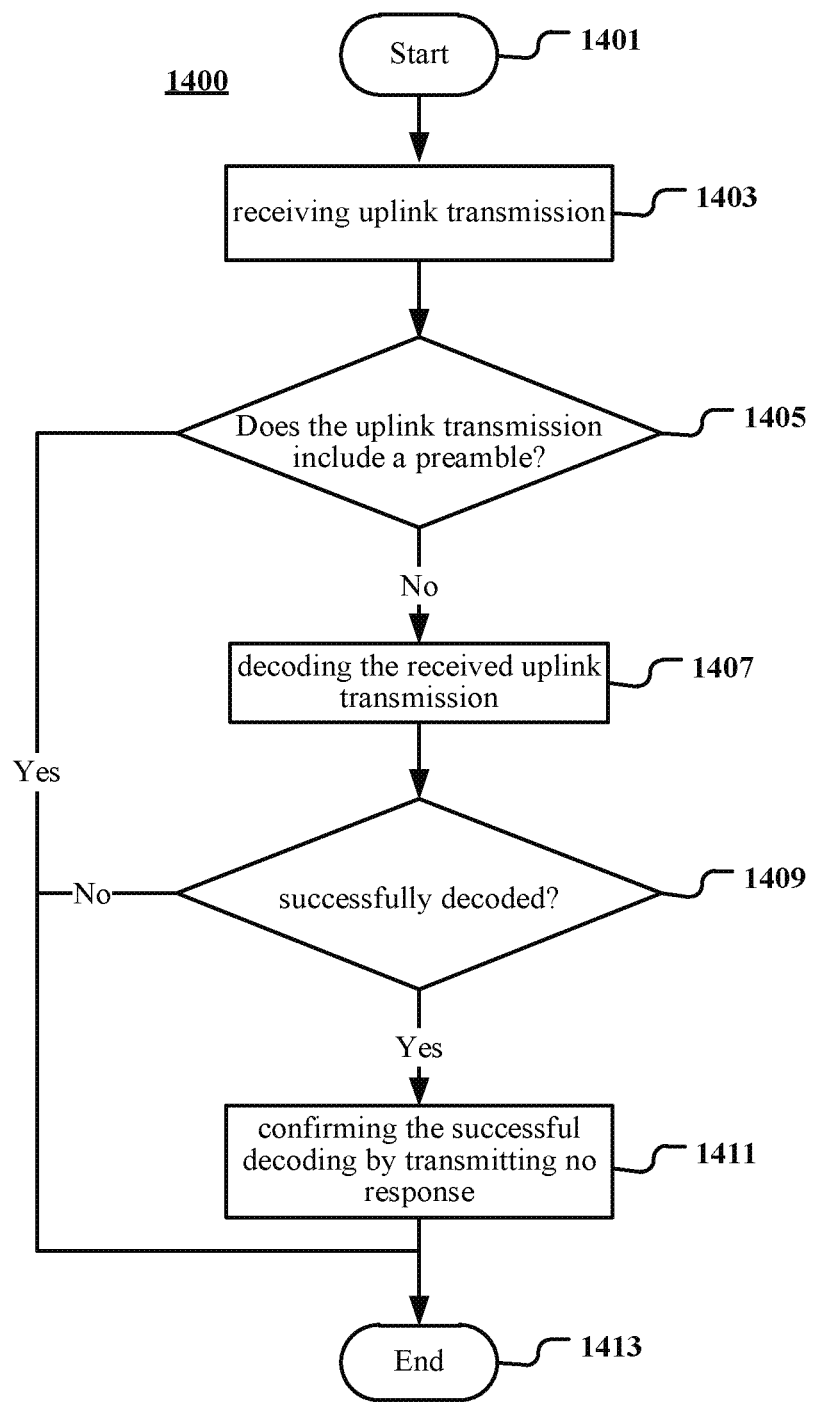
FIG. 14 is a flowchart of a method of wireless communication between a base station and user terminals according to an exemplary embodiment of the present disclosure.

FIG. 14 is a flowchart showing a method 1400 of wireless communication between a base station and user terminals according to an exemplary embodiment of the present disclosure.

As shown in FIG. 14, the method 1400 starts from step 1401. In step 1403, uplink transmissions from user terminals operating in a grant-free mode are received. The user terminals operating in the grant-free mode may have different priorities. A user terminal with a low priority (for example, an mMTC user terminal) does not transmit any preamble before transmitting data, and a user terminal with a high priority (for example, a URLLC user terminal) transmits both a preamble and following data.

In step 1405, it is determined whether the received uplink transmission includes the preamble. If the received uplink transmission includes the preamble, it indicates that the user terminal transmitting the uplink transmission is of a high priority, and thus the uplink transmission may be decoded and confirmed in the normal manner (not shown), and the method 1400 ends in step 1413. If the received uplink transmission does not include any preamble, it indicates that the user terminal transmitting the uplink transmission is of a low priority, and the received uplink transmission is decoded in step 1407. Next, in step 1409, it is determined whether the decoding is successful. If the decoding of the uplink transmission is successful, it is confirmed that the decoding is successful by not transmitting any response in step 1411, and the method 1400 ends in step 1413. If the decoding is determined to be unsuccessful in step 1409, it is confirmed that the uplink transmission is not successful in the normal manner (for example, by transmitting a NACK) (not shown), and the method 1400 ends in step 1413.

According to the embodiment shown in FIG. 14, in the case where an uplink transmission of a user terminal with a low priority is decoded successfully, the success may be confirmed by not transmitting any response. Since the number of user terminals with a low priority is usually large, with such a method of confirming the success by not transmitting any response, the signaling overhead can be significantly reduced.

Figure 15:
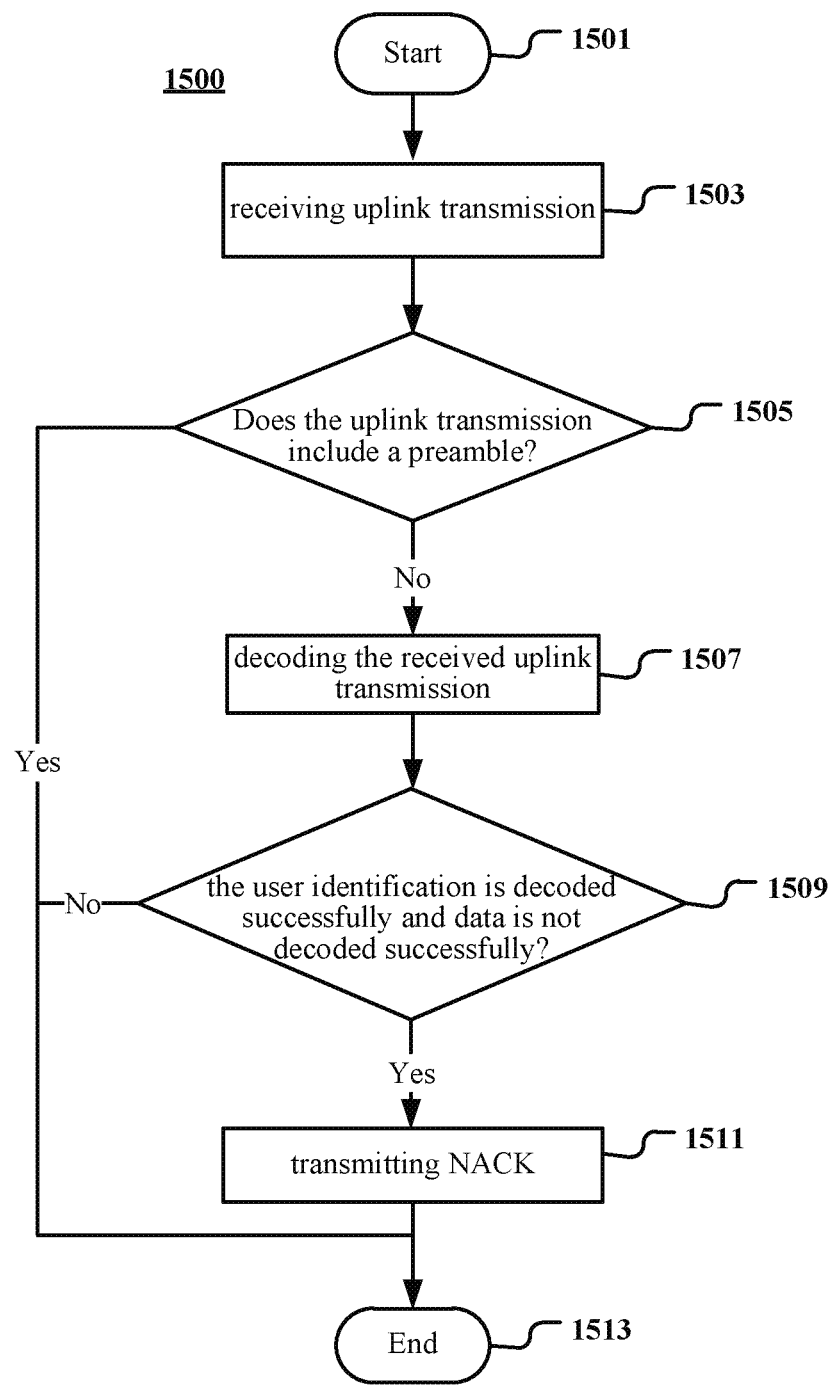
FIG. 15 is a flowchart of a method of wireless communication between a base station and user terminals according to an exemplary embodiment of the present disclosure.

FIG. 15 is a flowchart showing a method of wireless communication between a base station and user terminals according to an exemplary embodiment of the present disclosure.

As shown in FIG. 15, the method 1500 starts from step 1501. In step 1503, uplink transmissions from user terminals operating in a grant-free mode are received. The user terminals operating in the grant-free mode may have different priorities. A user terminal with a low priority (for example, an mMTC user terminal) does not transmit any preamble before transmitting data, and a user terminal with a high priority (for example, a URLLC user terminal) transmits a preamble and following data.

In step 1505, it is determined whether the received uplink transmission includes the preamble. If the received uplink transmission includes the preamble, it indicates that the user terminal transmitting the uplink transmission is of a high priority, and thus the uplink transmission may be decoded and confirmed in the normal manner (not shown), and the method 1500 ends in step 1513. If the received uplink transmission does not include any preamble, it indicates that the user terminal transmitting the uplink transmission is of a low priority, and the received uplink transmission is decoded in step 1507. Next, in step 1509, it is determined whether the following condition is met: a user identification in the uplink transmission is decoded successfully and the data in the uplink transmission is not decoded successfully. The user identification of the user terminal may be transmitted separately from the data. For example, in the case where the user terminal is an mMTC user terminal, the user identification may be transmitted via a demodulation reference signal (DMRS) and the data may be transmitted by a resource block. Since the user identification and the data are transmitted separately, there is a possibility that the user identification is successfully decoded and the data is not decoded successfully.

If it is determined in step 1509 that the condition is met, a NACK is transmitted to the user terminal indicated by the user identification via downlink control information in step 1511, and the method 1500 ends in step 1513. If it is determined in step 1509 that the condition is not met, the success or failure of the uplink transmission may be confirmed in the normal manner (not shown), and the method 1500 ends in step 1513.

According to the embodiment shown in FIG. 15, in an uplink transmission of a user terminal with a low priority, if the user identification is decoded successfully and the data is not decoded successfully, a NACK may be transmitted to a user terminal indicated by the user identification to notify that the uplink transmission is not successful, which may avoid notifying the user terminal via a broadcast mechanism.

Figure 16:
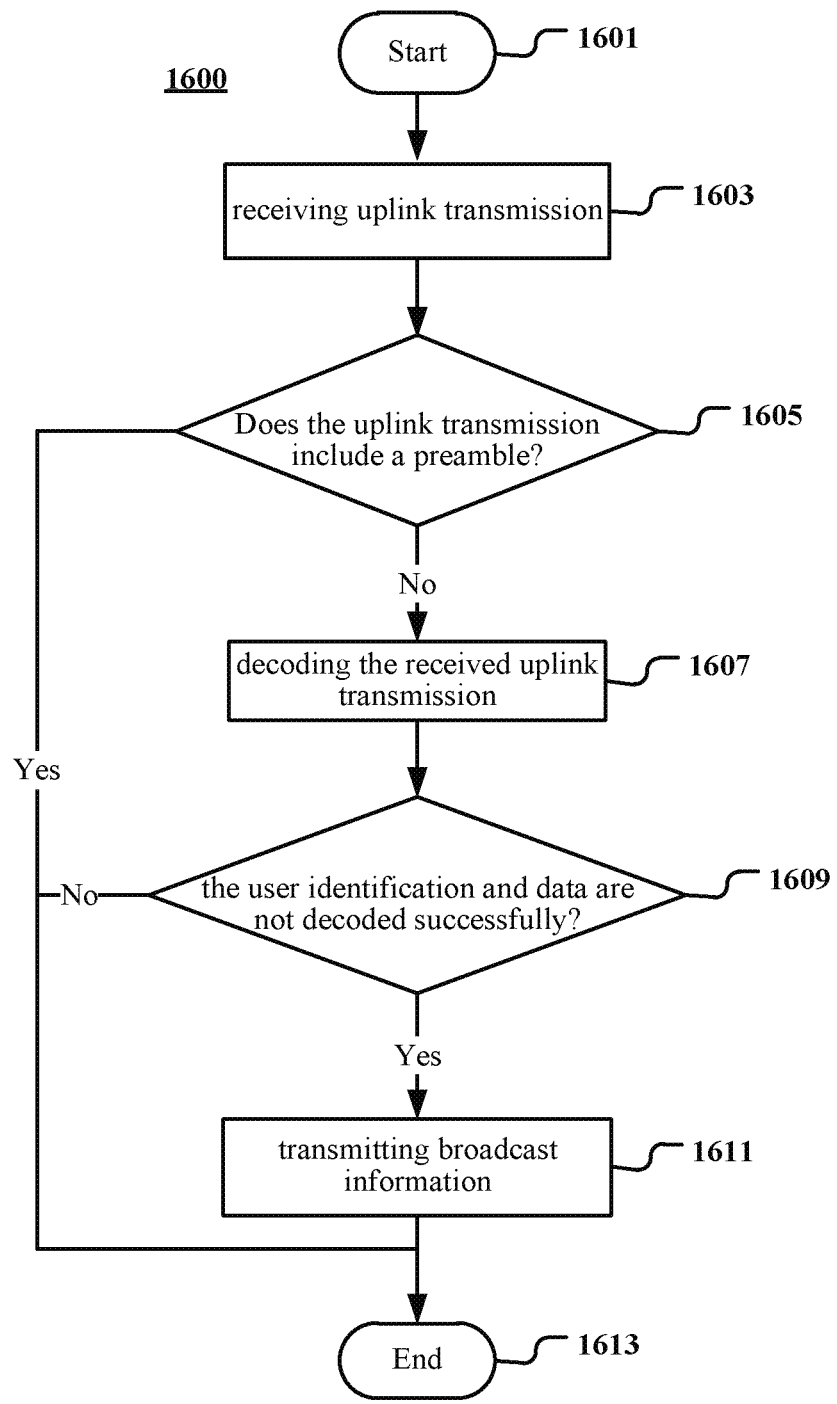
FIG. 16 is a flowchart of a method of wireless communication between a base station and user terminals according to an exemplary embodiment of the present disclosure.

FIG. 16 is a flowchart showing a method 1600 of wireless communication between a base station and user terminals according to an exemplary embodiment of the present disclosure.

As shown in FIG. 16, the method 1600 starts from step 1601. In step 1603, uplink transmissions from user terminals operating in a grant-free mode are received. The user terminals operating in the grant-free mode may have different priorities. A user terminal with a low priority (for example, an mMTC user terminal) does not transmit any preamble before transmitting data, and a user terminal with a high priority (for example, a URLLC user terminal) transmits both a preamble and following data.

In step 1605, it is determined whether the received uplink transmission includes the preamble. If the received uplink transmission includes the preamble, it indicates that the user terminal transmitting the uplink transmission is of a high priority, and thus the uplink transmission may be decoded and confirmed in the normal manner (not shown), and the method 1600 ends in step 1613. If the received uplink transmission does not include any preamble, it indicates that the user terminal transmitting the uplink transmission is of a low priority, and the received uplink transmission is decoded in step 1607. Next, in step 1609, it is determined whether the following condition is met: the user identification in the uplink transmission is not decoded successfully and data on at least one resource unit is not decoded successfully. The user identification of the user terminal may be transmitted separately from the data. For example, in the case where the user terminal is an mMTC user terminal, the user identification may be transmitted via a demodulation reference signal (DMRS) and the data may be transmitted via a resource block. Since the user identification and the data are transmitted separately, there is a possibility that the user identification is not decoded successfully and the data is not decoded successfully. In the case where different user terminals transmit data on the same resource unit, there is a possibility that user identification of one or more user terminals and data transmitted on the resource unit are not decoded successfully and identifications of other user terminals and data transmitted on the resource unit are decoded successfully.

If it is determined in step 1609 that the condition is met, broadcast information accessible by the user terminal is transmitted in step 1611 and the method 1600 ends in step 1613. The broadcast information includes information identifying a resource unit for carrying data which is not decoded successfully and information identifying a user terminal which has transmitted, on the resource unit, data that is decoded successfully. For example, the information identifying the resource unit may include an identification of the resource unit, and the information identifying the user terminal may include a user identification. If a user terminal that has transmitted data on a resource unit receives broadcast information, it may be determined, according to the broadcast information, whether the user identification of the user terminal and the data transmitted on the resource unit are decoded successfully.

For example, if the user terminal that has transmitted data on the resource unit determines that the resource unit is not identified in the broadcast information, it may be determined that the user identification of the user terminal and the data transmitted on the resource unit are decoded successfully according to the broadcast information.

For example, if the user terminal that has transmitted data on the resource unit determines that the resource unit is identified in the broadcast information, and the broadcast information indicates that the data transmitted by the user on the resource unit is successfully decoded, it may be determined that the user identification of the user terminal and the data transmitted on the resource unit are decoded successfully according to the broadcast information.

For example, if the user terminal that has transmitted data on the resource unit determines that the resource unit is identified in the broadcast information, and the user terminal is not among the user terminals that have transmitted data which is decoded successfully which are identified by the broadcast information, it may be determined that the user identification of the user terminal and the data transmitted on the resource unit are not decoded successfully according to the broadcast information.

If it is determined in step 1609 that the condition is not met, the success or failure of the uplink transmission may be confirmed in the normal manner (not shown), and the method 1600 ends in step 1613.

In a further embodiment of the embodiment according to FIG. 14, the processing branches of steps 1509, 1511 of the embodiment shown in FIG. 15 and steps 1609, 1611 of the embodiment shown in FIG. 16 may be combined, thereby realizing a positive acknowledgement (ACK) in the case where an uplink transmission of a user terminal with a low priority is decoded successfully, a NACK in the case where the user identification is successfully decoded and the data is not decoded successfully, and a broadcast notification in the case where the user identification and the data are not decoded successfully.

Figure 17:
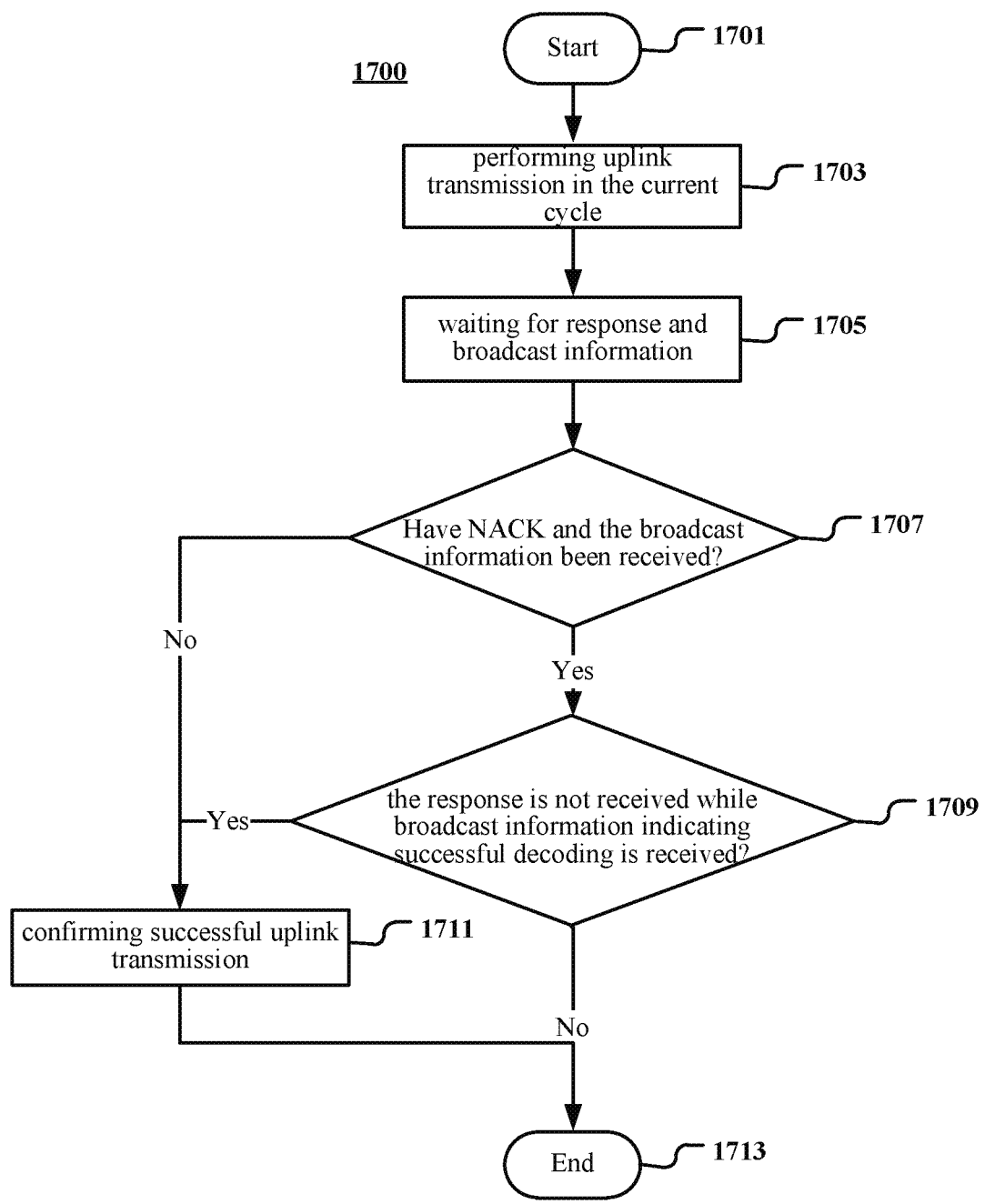
FIG. 17 is a flowchart of a method of grant-free uplink transmission on a user terminal according to an exemplary embodiment of the present disclosure.

FIG. 17 is a flowchart showing a method 1700 of grant-free uplink transmission on a user terminal according to an exemplary embodiment of the present disclosure.

As shown in FIG. 17, the method 1700 starts from step 1701. In step 1703, an uplink transmission of a current cycle is performed. In step 1705, a NACK and broadcast information from the base station is waited. In the case where the NACK and/or the broadcast information are received, or in the case where the waiting is timeout, the method 1700 exits step 1705 and performs step 1707. In step 1707, it is determined whether a NACK and broadcast information for a resource unit on which the uplink transmission is performed is received. The broadcast information includes information identifying a resource unit for carrying the data and information identifying a user terminal which has transmitted, on the resource unit, data that is decoded successfully. If the user terminal that has transmitted data on the resource unit receives the broadcast information, it may be determined whether the user identification of the user terminal and the data transmitted on the resource unit are decoded successfully according to the broadcast information.

If it is determined in step 1707 that no NACK and broadcast information for the uplink transmission of the resource unit is received, it may be confirmed that the uplink transmission on the resource unit is successful in step 1711, and the method 1700 ends in step 1713. If it is determined in step 1707 that the NACK or the broadcast information for the uplink transmission of the resource unit is received, it may be determined in step 1709 whether the following condition is met: no NACK for the resource unit is received and the broadcast information is received. The broadcast information includes information indicating that the uplink transmission of the user terminal on the resource unit is successfully decoded. The broadcast information includes information identifying a resource unit for carrying the data and information identifying a user terminal which has transmitted, on the resource unit, data that is decoded successfully. If the user terminal that has transmitted data on the resource unit receives the broadcast information, it may be determined whether the user identification of the user terminal and the data transmitted on the resource unit are decoded successfully according to the broadcast information. If it is determined in step 1709 that the condition is met, it is confirmed in step 1711 that the uplink transmission on the resource unit is successful, and the method 1700 ends in step 1713. If it is determined in step 1709 that the condition is not met, the failure of the uplink transmission may be confirmed in the normal manner (not shown), and the method 1700 ends in step 1713.

Figure 18:
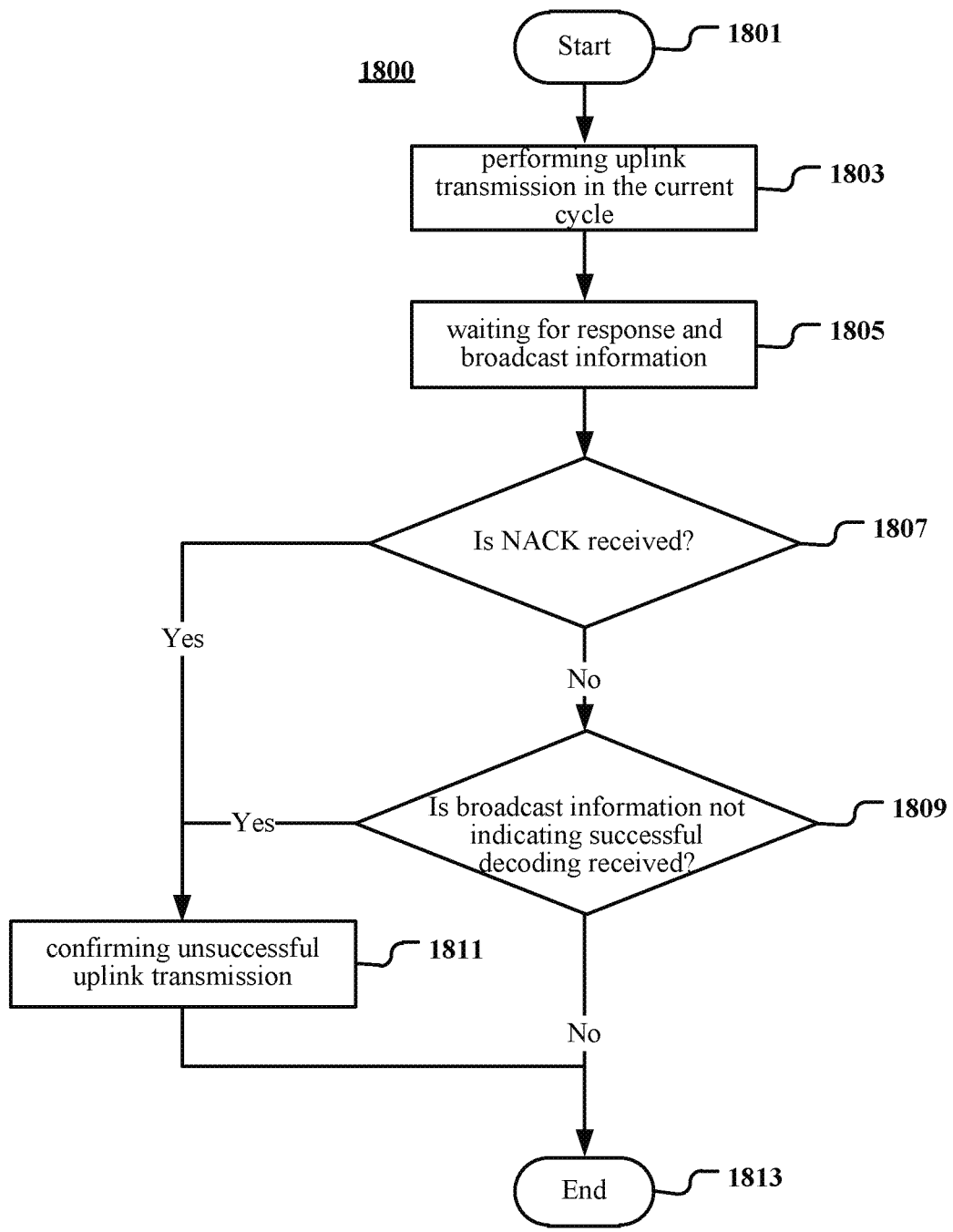
FIG. 18 is a flowchart of a method of grant-free uplink transmission on a user terminal according to an exemplary embodiment of the present disclosure.

FIG. 18 is a flowchart showing a method 1800 of grant-free uplink transmission on a user terminal according to an exemplary embodiment of the present disclosure.

As shown in FIG. 18, the method 1800 starts from step 1801. In step 1803, an uplink transmission of a current cycle is performed. In step 1805, a NACK and broadcast information from the base station is waited. The broadcast information includes information identifying a resource unit for carrying the data and information identifying a user terminal which has transmitted, on the resource unit, data that is decoded successfully. For example, in a case where each user terminal uses only one resource unit to transmit data, the user identification of the user terminal may identify a resource unit on which data is decoded successfully and a user terminal which has transmitted, on the resource unit, data that is decoded successfully. For another example, in the case where each user terminal uses more than one resource unit to transmit data, the resource unit on which data is decoded successfully may be identified by the identification of the resource unit, and the user identification of a user terminal is used to identify the user terminal which has transmitted, on the resource unit, data that is decoded successfully. In the case where a NACK and/or broadcast information is received, or in the case where the waiting is timeout, the method 1800 exits step 1805 and performs step 1807. In step 1807, it is determined whether a NACK is received for the resource unit on which the uplink transmission is performed.

If it is determined in step 1807 that the NACK for the uplink transmission of the resource unit is received, it is confirmed in step 1811 that the uplink transmission on the resource unit is not successful, and the method 1800 ends in step 1813. If it is determined in step 1807 that no NACK for the uplink transmission of the resource unit is received, in step 1809, it is determined whether the following condition is met: the broadcast information is received but information of the broadcast information does not indicate that the uplink transmission of the user terminal on the resource unit is successful. The broadcast information includes information identifying a resource unit for carrying the data and information identifying a user terminal which has transmitted, on the resource unit, data that is decoded successfully. If a user terminal that has transmitted data on a resource unit receives broadcast information, it may be determined whether the user identification of the user terminal and the data transmitted on the resource unit are decoded successfully according to the broadcast information. If it is determined in step 1809 that the condition is met, it is confirmed in step 1811 that the uplink transmission on the resource unit is not successful, and the method 1800 ends in step 1813. If it is determined in step 1809 that the condition is not met, the success of the uplink transmission may be confirmed in the normal manner (not shown), and the method 1800 ends in step 1813.

In a further embodiment of the embodiment shown in FIG. 17, the processing branches for determining whether the uplink transmission is not successful in the embodiment shown in FIG. 18 may be combined.

Figure 19:
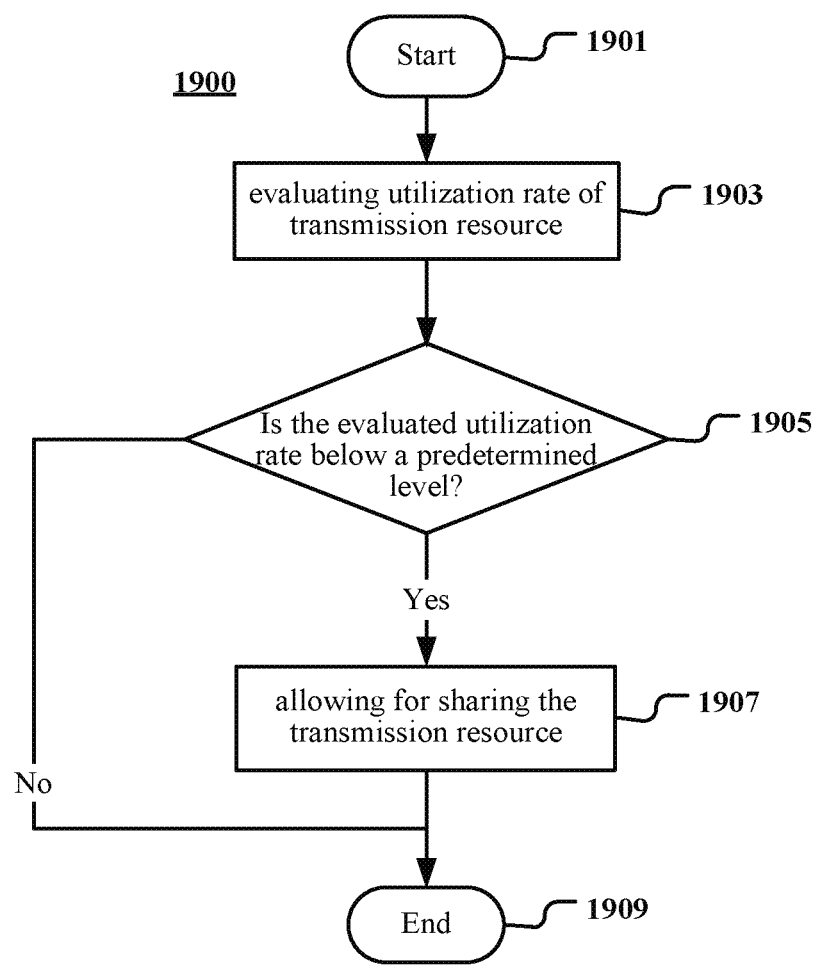
FIG. 19 is a flowchart of a method of wireless communication between a base station and user terminals according to an exemplary embodiment of the present disclosure.

FIG. 19 is a flowchart of a method 1900 of wireless communication between a base station and user terminals according to an exemplary embodiment of the present disclosure.

As shown in FIG. 19, the method 1900 starts from step 1901. In step 1903, utilization rate of transmission resources allocated for uplink transmissions in a grant-free mode is evaluated. For example, the utilization rate may reflect how many resource units in the resource pool for grant-free transmissions are used within a predetermined time, a frequency at which resource units are used within a predetermined time, or a combination thereof.

In step 1905, it is determined whether the evaluated utilization rate is below a predetermined level. If the utilization rate is not below the predetermined level, the method 1900 ends in step 1909. If the utilization rate is below the predetermined level, in step 1907, a user terminal operating in the grant mode is allowed to share a part of the transmission resource with a user terminal operating in the grant-free mode. For example, the user terminal operating in the grant mode may be notified via signaling for resource allocation to perform the uplink transmission in the grant mode on the allocated resource unit, and the allocated resource unit is still retained in the resource pool for the grant-free transmission. In this way, the allocated resource unit may be shared by the user terminal operating in the grant mode and the user terminal operating in the grant-free mode. Then, the method 1900 ends in step 1909. According to this embodiment, the user terminal operating in the grant mode is allowed to share a part of the transmission resources with the user terminal operating in the grant-free mode in the case where the resource contention is not serious, so that the resource utilization rate is improved while not reducing the decoding performance.

In an example, the user terminal operating in the grant mode may be an Enhanced Mobile Broadband (eMBB) user terminal, and the user terminal operating in the grant-free mode may be an mMTC user terminal and/or a URLLC user terminal.

In a further embodiment of the embodiment shown in FIG. 19, the base station may receive the uplink transmission from the user terminal operating in the grant-free mode and evaluate a decoding performance of the uplink transmission. In the case where the evaluated decoding performance of the uplink transmission is below a desired level, the sharing is reduced or cancelled. For example, some or all of the shared resource units may be unshared and used only for uplink transmission in the grant-free mode. This allows for a reduction or cancellation of sharing in the case of a degraded decoding performance, to improve the decoding performance of the uplink transmission in the grant-free mode. In a further embodiment, at least one user terminal operating in the grant-free mode is switched to the grant mode in the case where the evaluated decoding performance is below another level below the desired level. This allows for improving the decoding performance by reducing the number of user terminals operating in the grant-free mode in the case where the decoding performance is further degraded.

Figure 20:
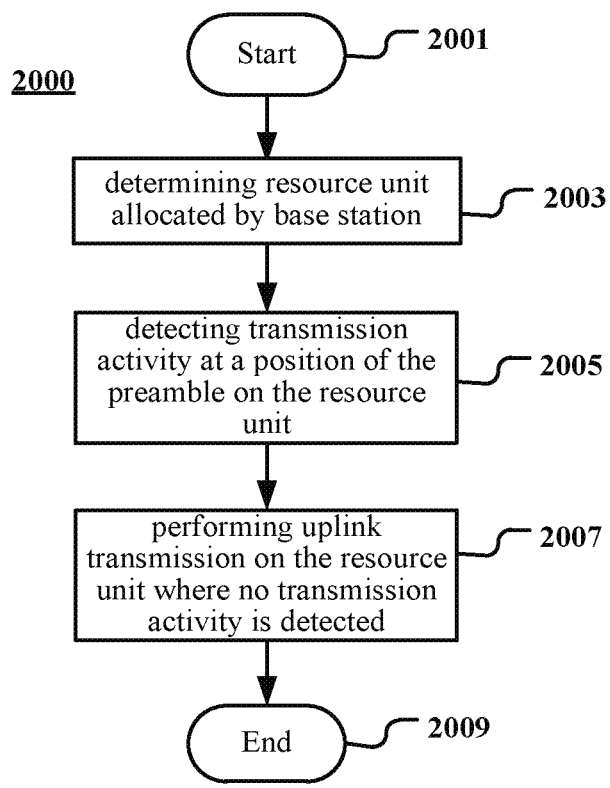
FIG. 20 is a flowchart of a method of grant-free uplink transmission on a user terminal according to an exemplary embodiment of the present disclosure.

FIG. 20 is a flowchart showing a method 2000 of grant-free uplink transmission on a user terminal according to an exemplary embodiment of the present disclosure.

As shown in FIG. 20, the method 2000 starts from step 2001. In step 2003, a resource unit allocated by a base station for the uplink transmission in the grant mode is determined. For example, the base station may notify the user terminal operating in the grant mode via signaling for resource allocation to perform uplink transmission in the grant mode on the allocated resource unit. Therefore, the user terminal may determine, according to the signaling, the resource unit allocated by the base station for the uplink transmission in the grant mode. In step 2005, a transmission activity at a a preamble on the determined resource unit is detected. In step 2007, the uplink transmission in the grant mode is performed on the resource unit where no transmission activity is detected. Then, the method 2000 ends in step 2009. According to this embodiment, in the case of sharing a resource unit, the user terminal performing the uplink transmission in the grant mode transmits data on the shared resource unit only when it is confirmed that there is no other user terminals transmitting the preamble on the shared resource unit, which may facilitate avoiding collisions.

The embodiments herein according to the present disclosure can be applied to various types of products. For example, the base station or network device in the above embodiments may include any type of evolved nodes B (eNB) such as macro eNB and small eNB. The small eNB may be an eNB that covers a cell smaller than a macro cell, such as pico eNB, micro eNB and home (femto) eNB. Alternatively, the network side device or the base station further may include any other type of base stations, such as NodeB and base transceiver station (BTS). The base station may include a main body (also referred to as base station device) configured to control wireless communication, and one or more remote radio heads (RRH) located at positions different from the main body. In addition, various types of terminal devices may function as a base station by performing the function of the base station temporarily or semi-permanently.

In another aspect, the terminal device or the user equipment in the above embodiments may be implemented as a communication terminal device (such as smart phone, panel personal computer (PC), notebook PC, portable game terminal, portable/dongle mobile router and digital camera) or an in-vehicle terminal device (such as car navigation device). The terminal device or the user equipment may also be implemented as a terminal device for performing machine to machine (M2M) communication, which is also referred to as a machine-type communication (MTC) terminal device. Further, the terminal device or the user equipment may be a wireless communication module mounted on each of the above terminals (such as an integrated circuit module including a single chip).

The implementation of the terminal device is described below by taking a smart phone as an example in connection with FIG. 21.

Figure 21:
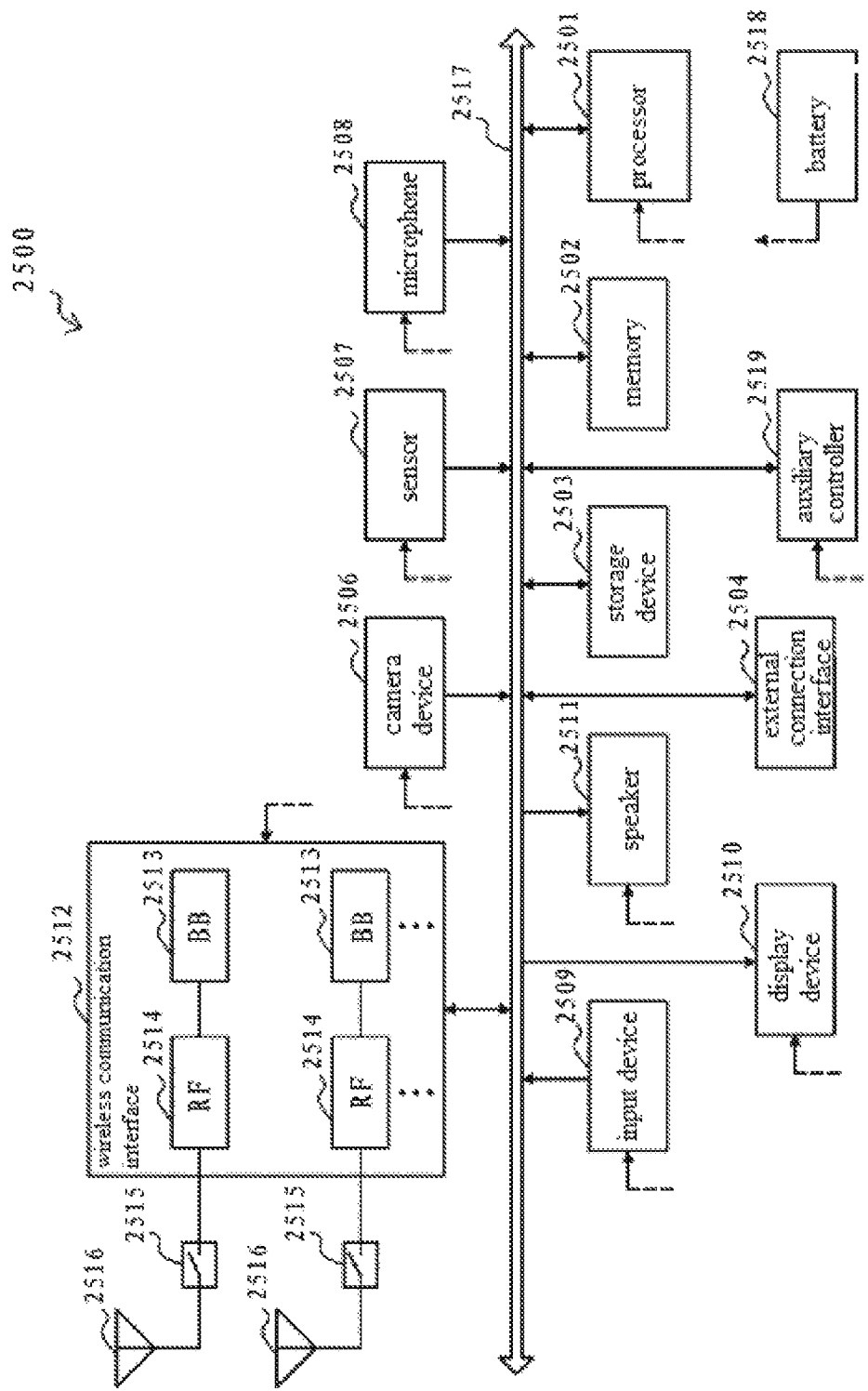
FIG. 21 is a schematic block diagram of a smart phone as an example of a terminal device.

FIG. 21 is a block diagram showing schematic configuration of a smart phone. As shown in FIG. 21, the smart phone 2500 includes a processor 2501, a memory 2502, a storage device 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518 and an auxiliary controller 2519.

The processor 2501 may be, for example, a CPU or a System On Chip (SoC), and controls functions of application layer and other layers of the smart phone 2500. The memory 2502 includes a RAM and a ROM, and stores a program that is executed by the processor 2501, and data. The storage device 2503 may include a storage medium such as semiconductor memory and hard disk. The external connection interface 2504 is an interface for connecting an external device (such as memory card and universal serial bus (USB) device) to the smart phone 2500.

The camera 2506 includes an image sensor (such as charge coupled device (CCD) and complementary metal oxide semiconductor (CMOS)), and generates a captured image. The sensor 2507 may include a set of sensors such as measurement sensor, gyro sensor, geomagnetic sensor, and acceleration sensor. The microphone 2508 converts sounds that are inputted to the smart phone 2500 into audio signals. The input device 2509 includes, for example, a touch sensor configured to detect touch onto a screen of the display device 2510, a keypad, a keyboard, a button, or a switch, and receive an operation or information inputted from a user. The display device 2510 includes a screen (such as liquid crystal display (LCD) and organic light-emitting diode (OLED) display), and displays an output image of the smart phone 2500. The speaker 2511 converts audio signals that are outputted from the smartphone 2500 to sounds.

The wireless communication interface 2512 supports any cellular communication scheme (such as LET and LTE-Advanced), and performs wireless communication. The wireless communication interface 2512 may typically include, for example, a baseband (BB) processor 2513 and a radio frequency (RF) circuit 2514. The BB processor 2513 may execute for example coding/decoding, modulation/demodulation and multiplexing/de-multiplexing, and execute various types of signal processing for wireless communications. The RF circuit 2514 may include for example a frequency mixer, a filter and an amplifier, and transmits and receives a wireless signal via the antenna 2516. The wireless communication interface 2512 may be a chip module with the BB processor 2513 and the RF circuit 2514 integrated thereon. As shown in FIG. 21, the wireless communication interface 2512 may include multiple BB processors 2513 and multiple RF circuits 2514. However, the wireless communication interface 2512 may also include a single BB processor 2513 or a single RF circuit 2514.

Furthermore, in addition to the cellular communication schemes, the wireless communication interface 2512 may support another type of wireless communication scheme such as short-range wireless communication scheme, near field communication scheme, and wireless local area network (LAN) scheme. In this case, the wireless communication interface 2512 may include the BB processor 2513 and the RF circuit 2514 for each wireless communication scheme.

Each of the antenna switches 2515 switches connection destinations of the antennas 2516 among multiple circuits (such as circuits for different wireless communication schemes) included in the wireless communication interface 2512.

Each of the antennas 2516 includes a single or multiple antenna elements (such as multiple antenna elements included in an MIMO antenna), and is used for the wireless communication interface 2512 to transmit and receive wireless signals. The smartphone 2500 may include the multiple antennas 2516, as shown in FIG. 21. However, the smart phone 2500 may also include a single antenna 2516.

Furthermore, the smart phone 2500 may include the antenna 2516 for each wireless communication scheme. In this case, the antenna switch 2515 may be omitted in the configuration of the smart phone 2500.

The bus 2517 connects the processor 2501, the memory 2502, the storage device 2503, the external connection interface 2504, the camera 2506, the sensor 2507, the microphone 2508, the input device 2509, the display device 2510, the speaker 2511, the wireless communication interface 2512, and the auxiliary controller 2519 to each other. The battery 2518 supplies power to respective components of the smart phone 2500 via feed lines which are partially shown with dashed lines in FIG. 21. The auxiliary controller 2519 for example performs the minimum function necessary for the smart phone 2500 in a sleep mode.

In the smart phone 2500 as shown in FIG. 21, a transceiving device of the terminal device may be implemented with the wireless communication interface 2512. At least a part of the functions of respective functional units of the terminal device may also be implemented with the processor 2501 or the auxiliary controller 2519. For example, a part of functions of the processor 2501 may be performed by the auxiliary controller 2519 and therefore consumption of power of the battery 2518 is reduced. Furthermore, the processor 2501 or the auxiliary controller 2519 may perform at least a part of the functions of respective functional units of the terminal device by executing programs stored in the memory 2502 or the storage device 2503.

The implementation of the based station is described below by taking an eNB as an example in connection with FIG. 23.

Figure 23:
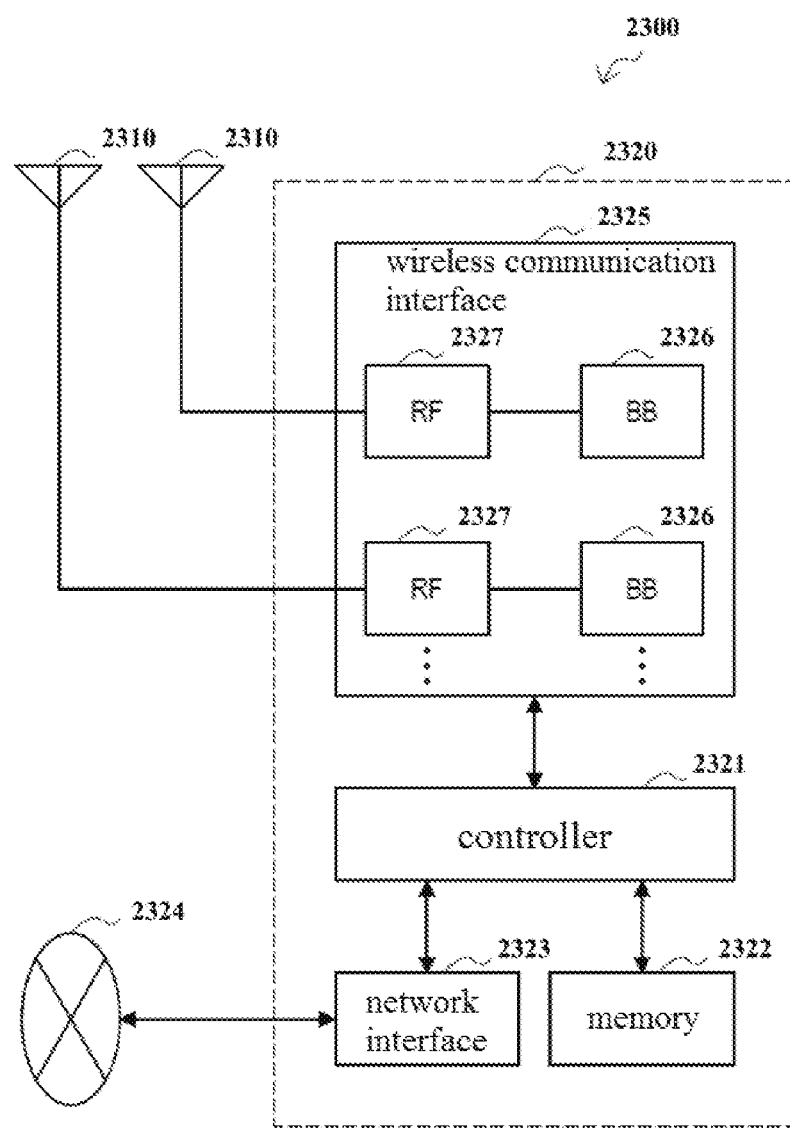
FIG. 23 is a schematic block diagram of an eNB as an example of a base station.

FIG. 23 is a block diagram showing a schematic configuration of an eNB. As shown in FIG. 23, an eNB 2300 includes one or more antennas 2310 and a base station device 2320. The base station device 2320 and each antenna 2310 may be connected with each other via a radio frequency (RF) cable.

Each of the antennas 2310 includes a single antenna element or multiple antenna elements (such as multiple antenna elements included in the multiple-input multiple-output (MIMO) antenna), and is used for the base station device 2320 to transmit and receive wireless signals. As show in FIG. 23, the eNB 2300 may include multiple antennas 2310. For example, the multiple antennas 2310 may be compatible with multiple frequency bands used by the eNB 2300. Although FIG. 23 shows an example that the eNB 2300 includes multiple antennas 2310, the eNB 2300 may also include a single antenna 2310.

The base station device 2320 includes a controller 2321, a memory 2322, a network interface 2323 and a wireless communication interface 2325.

The controller 2321 may be, for example, a CPU or a DSP, and may perform various functions of higher layers of the base station device 2320. For example, the controller 2321 generates data packets based on the data in the signal processed by the wireless communication interface 2325, and transfers the generated packets via the network interface 2323. The controller 2321 may bundle data from multiple baseband processors to generate bundled packet, and transfer the generated bundled packet. The controller 2321 may have logic functions for performing the following control: radio resource control, radio carrying control, mobility management, admission control and schedule. The control may be performed in conjunction with an adjacent eNB or a core network node. The memory 2322 includes a RAM and a ROM, and stores a program that is executed by the controller 2321, and various control data (such as terminal list, transmission power data, and scheduling data).

The network interface 2323 is a communication interface for connecting the base station device 2320 to a core network 2324. The controller 2321 may communicate with a core network node or another eNB via the network interface 2323. In this case, the eNB 2300 and the core network node or the other eNB may be connected with each other via a logic interface (such as S1 interface and X2 interface). The network interface 2323 may be a wired communication interface or a wireless communication interface for a wireless backhaul line. If the network interface 2323 is a wireless communication interface, the network interface 2323 may use a higher frequency band for wireless communication than that used by the wireless communication interface 2325.

The wireless communication interface 2325 supports any cellular communication scheme (such as long term evolution (LTE) and LTE-Advanced), and provides wireless connection to a terminal located in the cell of the eNB 2300 via the antenna 2310. The wireless communication interface 2325 may generally include for example the BB processor 2326 and the RF circuit 2327. The BB processor 2326 may perform for example coding/decoding, modulation/demodulation and multiplexing/de-multiplexing, and may perform various types of signal processing for the layers (for example, a L1 layer, a media access control (MAC) layer, a radio link control (RLC) layer and a packet data convergence protocol (PDCP) layer). Instead of the controller 2321, the BB processor 2326 may have a part or all of the above logic functions. The BB processor 2326 may be a memory storing communication control programs, or a module including a processor and a related circuit which are configured to execute programs. Updating the program may allow the functions of the BB processor 2326 to be changed. The module may be a card or blade inserted into the slot of the base station device 2320. Alternatively, the module may be a chip installed on the card or the blade. In addition, the RF circuit 2327 may include for example a frequency mixer, a filter or an amplifier, and transmits and receives wireless signals via the antenna 2310.

As shown in FIG. 23, the wireless communication interface 2325 may include multiple BB processors 2326. For example, the multiple BB processors 2326 may be compatible with multiple frequency bands used by the eNB 2300. As shown in FIG. 23, the wireless communication interface 2325 may include multiple RF circuits 2327. For example, the multiple RF circuits 2327 may be compatible with multiple antenna elements. Although FIG. 23 shows the example in which the wireless communication interface 2325 includes multiple BB processors 2326 and multiple RF circuits 2327, the wireless communication interface 2325 may include a single BB processor 2326 and a single RF circuit 2327.

In the eNB 2300 shown in FIG. 23, a transceiving device of the base station device may be implemented with the wireless communication interface 2325. At least a part of the functions of respective units may be performed by the controller 2321. For example, the controller 2321 may perform at least a part of the functions of respective functional units by executing programs stored in the memory 2322.

Devices and units described herein are only logical and do not strictly correspond to physical devices or entities. For example, the functionality of each unit described herein may be implemented by multiple physical entities or the functionality of multiple units described herein may be implemented by a single physical entity. In addition, it should be noted that features, components, elements or steps, and the like described in an embodiment are not limited to this embodiment, but may also be applied to other embodiments, for example, may substitute for specific features, components, elements, or steps, and the like in other embodiments or may be combined with them.

The processes executed by each device or module in the above embodiments may be implemented by software, hardware, or a combination of the software and the hardware. The programs included in the software may be stored in advance in a storage medium provided inside or outside each device or component. As an example, during execution, these programs are written to a random access memory (RAM) and executed by a processor (for example, a CPU) to perform the processes described in the above embodiments. The present disclosure includes program codes and a program product, as well as a computer readable storage medium on which the program codes are recorded.

Figure 22:
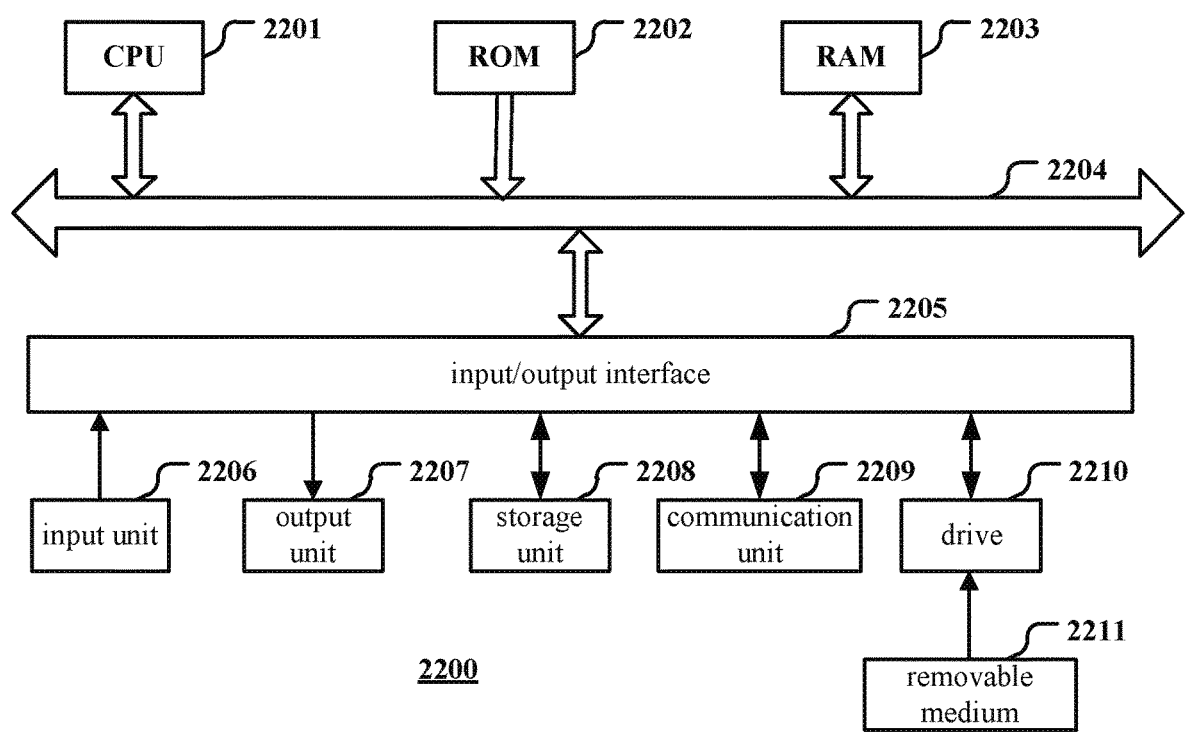
FIG. 22 is a block diagram showing a schematic configuration of computer hardware.

FIG. 22 is a block diagram showing an example configuration of computer hardware that executes the method of the present disclosure based on a program.

In a computer 2100, a central processing unit (CPU) 2101, a read only memory (ROM) 2102, and a random access memory (RAM) 2103 are connected to each other via a bus 2104.

An input/output interface 2105 is further connected to the bus 2104. The following components are connected to the input/output interface 2105: an input unit 2106 in the form of keyboard, mouse, microphone and the like; an output unit 2107 in the form of display, speaker and the like; a storage unit 2108 in the form of hard disk, non-volatile memory and the like; a communication unit 2109 in the form of network interface card (such as Local area network (LAN) card and modem); and a driver 2110 for driving a removable medium 2111 such as magnetic disk, optical disk, magnetic optical disk or semiconductor memory.

In the computer having the above structure, the CPU 2101 loads the programs stored in the storage unit 2108 into the RAM 2103 via the input/output interface 2105 and the bus 2104, and executes the programs to perform the above processing.

A program to be executed by a computer (the CPU 2101) may be recorded on the removable medium 2111 which is a package medium formed of, for example, a magnetic disk (including a floppy disk), an optical disk (including a compact disk-read only memory (CD-ROM), a digital versatile disk (DVD) and the like), a magneto-optical disk or a semiconductor memory. In addition, the program to be executed by the computer (the CPU 2101) may also be provided via a wired or wireless transmission medium such as local area network, the internet or digital satellite broadcasting.

In a case where the removable medium 2111 is installed in the drive 2110, the program may be installed in the storage unit 2108 via the input/output interface 2105. In addition, the program may be received by the communication unit 2109 via a wired or wireless transmission medium, and then the program may be installed in the storage unit 2108. Alternatively, the program may be pre-installed in the ROM 2102 or the storage unit 2108.

The programs to be executed by the computer may be programs for executing processes in the order described in the specification, or may be programs for executing processes in parallel or when required (e.g. when invoked).

The embodiments and the technical effects of the present disclosure have been described above in detail in conjunction with the drawings, but the scope of the present disclosure is not limited thereto. It should be understood by those skill in the art that various modifications or changes in the embodiments discussed herein can be made without departing from the spirit and principle of the present disclosure, depending on design requirements and other factors. The scope of the present disclosure is defined by the appended claims or their equivalents.

In addition, the present disclosure may also be configured as follows.

A method of performing wireless communication between a base station and user terminals, includes:

receiving uplink transmissions from first type user terminals operating in a grant-free mode; and switching at least one of the first type user terminals to a grant mode in case that an evaluated decoding performance of the uplink transmissions is below a desired level.

The method further includes: evaluating the decoding performance.

The method further includes: determining the evaluated decoding performance according to an average number of the first type user terminals accessing the base station during a predetermined time period.

The method further includes: determining the evaluated decoding performance according to an accumulated number of user terminals encountering a decoding failure.

In the method, the switching includes: determining a target number such that a decoding performance for the grant-free mode is not below the desired level after the target number of the first type user terminals are switched to the grant mode; and switching the target number of the first type user terminals to the grant mode.

In the method, the switching includes: determining a minimum number such that a decoding performance for the grant-free mode is not below the desired level after the target number of the first type user terminals are switched to the grant mode, as a target number; and switching the target number of the first type user terminals to the grant mode.

In the method, the switching includes: counting an elapsed time; and based on the first type user terminals remained after the switching, determining an average number of the remained first type user terminals as the evaluated decoding performance.

In the method, the switching includes: updating the desired level as a maximum average number, where the accumulated number of user terminals encountering a decoding failure corresponding to the counted time is higher than a threshold number, and the accumulated number is obtained according to a relation on condition of an average number larger than the maximum average number, among relations of the counted time and the accumulated number of user terminals encountering a decoding failure on condition of different amounts of resources available for grant-free uplink transmission of the first type user terminals after the switching and different average numbers of the first type user terminals accessing the base station during a unit time.

In the method, the switching includes: counting an elapsed time; based on the first type user terminals remained after the switching, determining an average number of the remained first type user terminals; and obtaining the accumulated number of user terminals encountering a decoding failure corresponding to the counted time as the evaluated decoding performance, according to a relation of the counted time and the accumulated number of user terminals encountering a decoding failure on condition of an amount of resources available for grant-free uplink transmission of the first type user terminals after the switching and the average number.

A method of performing wireless communication between a base station and user terminals, includes: determining whether a received uplink transmission includes a preamble based on the uplink transmission; if the uplink transmission does not include the preamble, determining that the uplink transmission comes from a first type user terminal and decoding the received uplink transmission, where the first type user terminal has a first priority and operates in a grant-free mode; and if the uplink transmission includes the preamble, determining that the uplink transmission comes from a second type user terminal and decoding the received uplink transmission, where the uplink transmission includes the preamble and data following the preamble, the preamble includes an identification for the second type user terminal transmitting the preamble, and the second type user terminal has a second priority lower than the first priority and operates in a grant-free mode.

In the method, if a preamble in an uplink transmission from a second type user terminal is decoded successfully and data in the uplink transmission is not decoded successfully, the second type user terminal is switched to a grant mode for data transmission.

The method includes: switching at least one of the first type user terminals to a grant mode in case that an evaluated decoding performance of the uplink transmissions is below a desired level.

The method further includes: determining the evaluated decoding performance according to an average number of the first type user terminals accessing the base station during a predetermined time period.

The method further includes: determining the evaluated decoding performance according to an accumulated number of user terminals encountering a decoding failure.

In the method, the switching includes: determining a target number such that a decoding performance for the grant-free mode is not below the desired level after the target number of the first type user terminals are switched to the grant mode; and switching the target number of the first type user terminals to the grant mode.

In the method, the switching includes: determining a minimum number such that a decoding performance for the grant-free mode is not below the desired level after the target number of the first type user terminals are switched to the grant mode, as a target number; and switching the target number of the first type user terminals to the grant mode.

In the method, the switching includes: counting an elapsed time; and based on the first type user terminals remained after the switching, determining an average number of the remained first type user terminals as the evaluated decoding performance.

In the method, the switching includes: updating the desired level as a maximum average number, where the accumulated number of user terminals encountering a decoding failure corresponding to the counted time is higher than a threshold number, and the accumulated number is obtained according to a relation on condition of an average number larger than the maximum average number, among relations of the counted time and the accumulated number of user terminals encountering a decoding failure on condition of different amounts of resources available for grant-free uplink transmission of the first type user terminals after the switching and different average numbers of the first type user terminals accessing the base station during a unit time.

In the method, the switching includes: counting an elapsed time; based on the first type user terminals remained after the switching, determining an average number of the remained first type user terminals; and obtaining the accumulated number of user terminals encountering a decoding failure corresponding to the counted time as the evaluated decoding performance, according to a relation of the counted time and the accumulated number of user terminals encountering a decoding failure on condition of an amount of resources available for grant-free uplink transmission of the first type user terminals after the switching and the average number.

A method of performing grant-free uplink transmission in a user terminal includes: selecting at least one resource unit from a resource pool for the grant-free uplink transmission; detecting a transmission activity at a preamble on the resource unit; and performing the uplink transmission on the resource unit where no transmission activity is detected.

In the method, the performing the uplink transmission includes: determining randomly a resource unit from resource units where no transmission activity is detected; and performing the uplink transmission on the determined resource unit.

The method further includes: if the transmission activity is detected from a location of a preamble on each of the selected resource units in the current cycle, no uplink transmission is performed in the current cycle, and the steps of selecting, detecting, and performing the uplink transmission are performed in the next cycle.

A method of performing wireless communication between a base station and user terminals, includes: receiving an uplink transmission from a user terminal operating in a grant-free mode; determining whether the uplink transmission includes a preamble; if the uplink transmission does not include the preamble, decoding the received uplink transmission, and if the uplink transmission is decoded successfully, no response is transmitted for the uplink transmission.

A method of performing wireless communication between a base station and user terminals, includes: receiving an uplink transmission from a user terminal operating in a grant-free mode; determining whether the uplink transmission includes a preamble; if the uplink transmission does not include the preamble, decoding the received uplink transmission, and if a user identification in the uplink transmission is decoded successfully and data in the uplink transmission is not decoded successfully, a NACK is transmitted to the user terminal indicated by the user identification through downlink control information.

A method of performing wireless communication between a base station and user terminals, includes: receiving an uplink transmission from a user terminal operating in a grant-free mode; determining whether the uplink transmission includes a preamble; and if the uplink transmission does not include the preamble, decoding the received uplink transmission, and if a user identification and data in the uplink transmission are not decoded successfully, broadcast information accessible to the user terminal is transmitted, where the broadcast information includes information identifying a resource unit for carrying the data and information identifying a user terminal which has transmitted, on the resource unit, data that is decoded successfully.

A method of performing grant-free uplink transmission in a user terminal, includes: performing an uplink transmission of a current cycle, where the user terminal operates in a grant-free mode; waiting for a NACK and broadcast information from a base station; and confirming that the uplink transmission on a resource unit is successful in case of meeting the following condition: 1) no NACK for the resource unit and broadcast information is received, where the broadcast information includes information identifying a resource unit for carrying data which is not decoded successfully and information identifying a user terminal which has transmitted, on the resource unit, data that is decoded successfully, or 2) no NACK for the resource unit is received, but broadcast information is received, where information in the broadcast information indicates that the uplink transmission of the user terminal on the resource unit is decoded successfully.

A method of performing grant-free uplink transmission in a user terminal, includes: performing an uplink transmission of a current cycle, where the user terminal operates in a grant-free mode; waiting for a NACK and broadcast information from a base station; and confirming that the uplink transmission on a resource unit is not successful in case of meeting the following condition: 1) a NACK for the resource unit is received, or 2) broadcast information is received, where the broadcast information includes information identifying a resource unit for carrying data which is not decoded successfully and information identifying a user terminal which has transmitted, on the resource unit, data that is decoded successfully, where information in the broadcast information does not indicate that the uplink transmission of the user terminal on the resource unit is decoded successfully.

A method of performing wireless communication between a base station and user terminals, includes: evaluating utilization rate of transmission resources allocated for uplink transmissions in a grant-free mode; and in case of the utilization rate below a predetermined level, allowing a user terminal operating in the grant-free mode and a user terminal operating in a grant mode to share a part of the transmission resources.

The method further includes: receiving an uplink transmission from a first type user terminal operating in the grant-free mode; and reducing or cancelling the sharing in case that an evaluated decoding performance of the uplink transmission is below a first desired level.

The method further includes: switching at least one of the first type user terminals to a grant mode in case that an evaluated decoding performance of the uplink transmissions is below a desired level, where the second desired level is lower than the first desired level.

A method of performing uplink transmission in a grant mode in a user terminal, includes: determining a resource unit allocated by a base station for the uplink transmission in the grant mode; detecting a transmission activity at a preamble on the resource unit; and performing the uplink transmission in the grant mode on the resource unit where no transmission activity is detected.

A base station includes processing circuitry configured for: receiving uplink transmissions from first type user terminals operating in a grant-free mode; and switching at least one of the first type user terminals to a grant mode in case that an evaluated decoding performance of the uplink transmissions is below a desired level.

A base station includes processing circuitry configured for: determining whether a received uplink transmission includes a preamble based on the uplink transmission; if the uplink transmission does not include the preamble, determining that the uplink transmission comes from a first type user terminal and decoding the received uplink transmission, where the first type user terminal has a first priority and operates in a grant-free mode; and if the uplink transmission includes the preamble, determining that the uplink transmission comes from a second type user terminal and decoding the received uplink transmission, where the uplink transmission includes the preamble and data following the preamble, the preamble includes an identification for the second type user terminal transmitting the preamble, and the second type user terminal has a second priority lower than the first priority and operates in a grant-free mode.

A user terminal includes processing circuitry configured for: selecting at least one resource unit from a resource pool for the grant-free uplink transmission; detecting a transmission activity at a preamble on the resource unit; and performing the uplink transmission on the resource unit where no transmission activity is detected.

A base station includes processing circuitry configured for: receiving an uplink transmission from a user terminal operating in a grant-free mode; determining whether the uplink transmission includes a preamble; if the uplink transmission does not include the preamble, decoding the received uplink transmission, and if the uplink transmission is decoded successfully, no response is transmitted for the uplink transmission.

A base station includes processing circuitry configured for: receiving an uplink transmission from a user terminal operating in a grant-free mode; determining whether the uplink transmission includes a preamble; if the uplink transmission does not include the preamble, decoding the received uplink transmission, and if a user identification in the uplink transmission is decoded successfully and data in the uplink transmission is not decoded successfully, a NACK is transmitted to the user terminal indicated by the user identification through downlink control information.

A base station includes processing circuitry configured for: receiving an uplink transmission from a user terminal operating in a grant-free mode; determining whether the uplink transmission includes a preamble; and if the uplink transmission does not include the preamble, decoding the received uplink transmission, an if a user identification and data in the uplink transmission are not decoded successfully, broadcast information accessible to the user terminal is transmitted, where the broadcast information includes information identifying a resource unit for carrying the data and information identifying a user terminal which has transmitted, on the resource unit, data that is decoded successfully.

A user terminal includes processing circuitry configured for: performing an uplink transmission of a current cycle, where the user terminal operates in a grant-free mode; waiting for a NACK and broadcast information from a base station; and confirming that the uplink transmission on a resource unit is successful in case of meeting the following condition: 1) no NACK for the resource unit and broadcast information is received, where the broadcast information includes information identifying a resource unit for carrying data which is not decoded successfully and information identifying a user terminal which has transmitted, on the resource unit, data that is decoded successfully, or 2) no NACK for the resource unit is received, but broadcast information is received, where information in the broadcast information indicates that the uplink transmission of the user terminal on the resource unit is decoded successfully.

A user terminal includes processing circuitry configured for: performing an uplink transmission of a current cycle, where the user terminal operates in a grant-free mode; waiting for a NACK and broadcast information from a base station; and confirming that the uplink transmission on a resource unit is not successful in case of meeting the following condition: 1) a NACK for the resource unit is received, or 2) broadcast information is received, where the broadcast information includes information identifying a resource unit for carrying data which is not decoded successfully and information identifying a user terminal which has transmitted, on the resource unit, data that is decoded successfully, where information in the broadcast information does not indicate that the uplink transmission of the user terminal on the resource unit is decoded successfully.

A base station includes processing circuitry configured for: evaluating utilization rate of transmission resources allocated for uplink transmissions in a grant-free mode; and in case of the utilization rate below a predetermined level, allowing a user terminal operating in the grant-free mode and a user terminal operating in a grant mode to share a part of the transmission resources.

A user terminal includes processing circuitry configured for: determining a resource unit allocated by a base station for an uplink transmission in a grant mode; detecting a transmission activity at a preamble on the resource unit; and performing the uplink transmission in the grant mode on the resource unit where no transmission activity is detected.

The invention claimed is:

1. A method of performing wireless communication between a base station and user terminals, comprising:
   receiving uplink transmissions from first type user terminals operating in a grant-free mode; and
   switching at least one of the first type user terminals to a grant mode when an evaluated decoding performance of the uplink transmissions is below a desired level;
   determining a target number or a minimum number such that a decoding performance for the grant-free mode is not below the desired level after the target number of the first type user terminals are switched to the grant mode; and
   switching the target number of the first type user terminals to the grant mode.

2. The method according to claim 1, wherein the switching comprises:
   counting an elapsed time;
   based on the first type user terminals remained after the switching, determining an average number of the remained first type user terminals as the evaluated decoding performance; and
   updating the desired level as a maximum average number, wherein the accumulated number of user terminals encountering a decoding failure corresponding to the counted time is higher than a threshold number, and the accumulated number is obtained according to a relation on condition of an average number larger than the maximum average number, among relations of the counted time and the accumulated number of user terminals encountering a decoding failure on condition of different amounts of resources available for grant-free uplink transmission of the first type user terminals after the switching and different average numbers of the first type user terminals accessing the base station during a unit time.

3. The method according to claim 1, wherein the switching comprises:
   counting an elapsed time;
   based on the first type user terminals remained after the switching, determining an average number of the remained first type user terminals; and
   obtaining the accumulated number of user terminals encountering a decoding failure corresponding to the counted time as the evaluated decoding performance, according to a relation of the counted time and the accumulated number of user terminals encountering a decoding failure on condition of an amount of resources available for grant-free uplink transmission of the first type user terminals after the switching and the average number.

4. A method of performing wireless communication between a base station and user terminals, comprising:

determining whether a received uplink transmission comprises a preamble based on the uplink transmission;

when the uplink transmission does not comprise the preamble, determining that the uplink transmission comes from a first type user terminal and decoding the received uplink transmission, wherein the first type user terminal has a first priority and operates in a grant-free mode; and when the uplink transmission comprises the preamble, determining that the uplink transmission comes from a second type user terminal and decoding the received uplink transmission, wherein the uplink transmission comprises the preamble and data following the preamble, the preamble comprises an identification for the second type user terminal transmitting the preamble, and the second type user terminal has a second priority lower than the first priority and operates in a grant-free mode.

5. The method according to claim 4, wherein when a preamble in an uplink transmission from a second type user terminal is decoded successfully and data in the uplink transmission is not decoded successfully, the second type user terminal is switched to a grant mode for data transmission.

6. A method of performing wireless communication between a base station and user terminals, comprising:
evaluating a utilization rate of transmission resources allocated for uplink transmissions in a grant-free mode; and
sharing a part of the transmission resources between a user terminal operating in the grant-free mode and a user terminal operating in a grant mode when the utilization rate is below a predetermined level.

7. The method according to claim 6, further comprising:
receiving an uplink transmission from a first type user terminal operating in the grant-free mode; and
reducing or cancelling the sharing in case that an evaluated decoding performance of the uplink transmission is below a first desired level.

\* \* \* \* \*